(12) United States Patent
Fujita et al.

(10) Patent No.: US 10,343,421 B2
(45) Date of Patent: Jul. 9, 2019

(54) AQUEOUS INK FOR INK JET RECORDING, AQUEOUS INK SET FOR INK JET RECORDING, AND INK JET RECORDING APPARATUS

(71) Applicant: FUJI XEROX CO., LTD., Tokyo (JP)

(72) Inventors: Mamoru Fujita, Kanagawa (JP); Yoshiro Yamashita, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 15/652,551

(22) Filed: Jul. 18, 2017

(65) Prior Publication Data

US 2018/0111388 A1    Apr. 26, 2018

(30) Foreign Application Priority Data

Oct. 20, 2016  (JP) .................................. 2016-206281

(51) Int. Cl.
| | | |
|---|---|---|
| *B41J 11/00* | (2006.01) | |
| *C09D 11/38* | (2014.01) | |
| *C09D 11/033* | (2014.01) | |
| *C09D 11/101* | (2014.01) | |
| *C09D 11/102* | (2014.01) | |
| *C09D 11/322* | (2014.01) | |

(52) U.S. Cl.
CPC .......... *B41J 11/002* (2013.01); *C09D 11/033* (2013.01); *C09D 11/101* (2013.01); *C09D 11/102* (2013.01); *C09D 11/322* (2013.01); *C09D 11/38* (2013.01)

(58) Field of Classification Search
CPC ..................................................... B41J 11/002
See application file for complete search history.

(56) References Cited

U.S. PATENT DOCUMENTS

2003/0222961 A1* 12/2003 Nakajima .............. B41J 11/002
                                                       347/102

FOREIGN PATENT DOCUMENTS

| JP | 2001-226618 A | 8/2001 |
| JP | 2002-080764 A | 3/2002 |
| JP | 2013-189596 A | 9/2013 |

* cited by examiner

*Primary Examiner* — Julian D Huffman
(74) *Attorney, Agent, or Firm* — Sughrue Mion, PLLC

(57) ABSTRACT

An aqueous ink for ink jet recording includes water, a water-soluble organic solvent, a coloring material, and a near-infrared absorbent, wherein a continuous range of wavelengths in which an absorption amount of the ink is not less than 80% of a maximum absorption amount of the ink in a near-infrared region is 10 nm or more.

18 Claims, 3 Drawing Sheets

AQUEOUS INK FOR INK JET RECORDING, AQUEOUS INK SET FOR INK JET RECORDING, AND INK JET RECORDING APPARATUS

CROSS-REFERENCE TO RELATED APPLICATIONS

This application is based on and claims priority under 35 USC 119 from Japanese Patent Application No. 2016-206281 filed Oct. 20, 2016.

BACKGROUND

1. Technical Field

The present invention is related to an aqueous ink for ink jet recording, an aqueous ink set for ink jet recording, and an ink jet recording apparatus.

2. Related Art

An aqueous ink jet recording apparatus for mass printing is required to perform high-speed printing compared to an aqueous ink jet recording apparatus for home and office, and a solvent contained in the ink is evaporated by using a drying device after printing from the viewpoint of image fixing and the like.

For such an aqueous ink jet recording apparatus, a method of adding a near-infrared absorbent having absorption ability of near-infrared to an ink and thereby drying and fixing the ink by emitting near-infrared after printing, has been proposed. By emitting near-infrared to an ink printed on a recording medium, a solvent in the ink is rapidly evaporated, and therefore infiltration of the solvent into the recording medium, diffusion, and the like are prevented, which lead to improvement in the image quality.

SUMMARY

According to an aspect of the invention, there is provided an aqueous ink for ink jet recording, including: water;
a water-soluble organic solvent;
a coloring material; and
a near-infrared absorbent,
wherein a continuous range of wavelengths in which an absorption amount of the ink is not less than 80% of a maximum absorption amount of the ink in a near-infrared region is 10 nm or more.

BRIEF DESCRIPTION OF THE DRAWINGS

Exemplary embodiments of the present invention will be described in detail based on the following figures, wherein.

DETAILED DESCRIPTION

Figure 1:
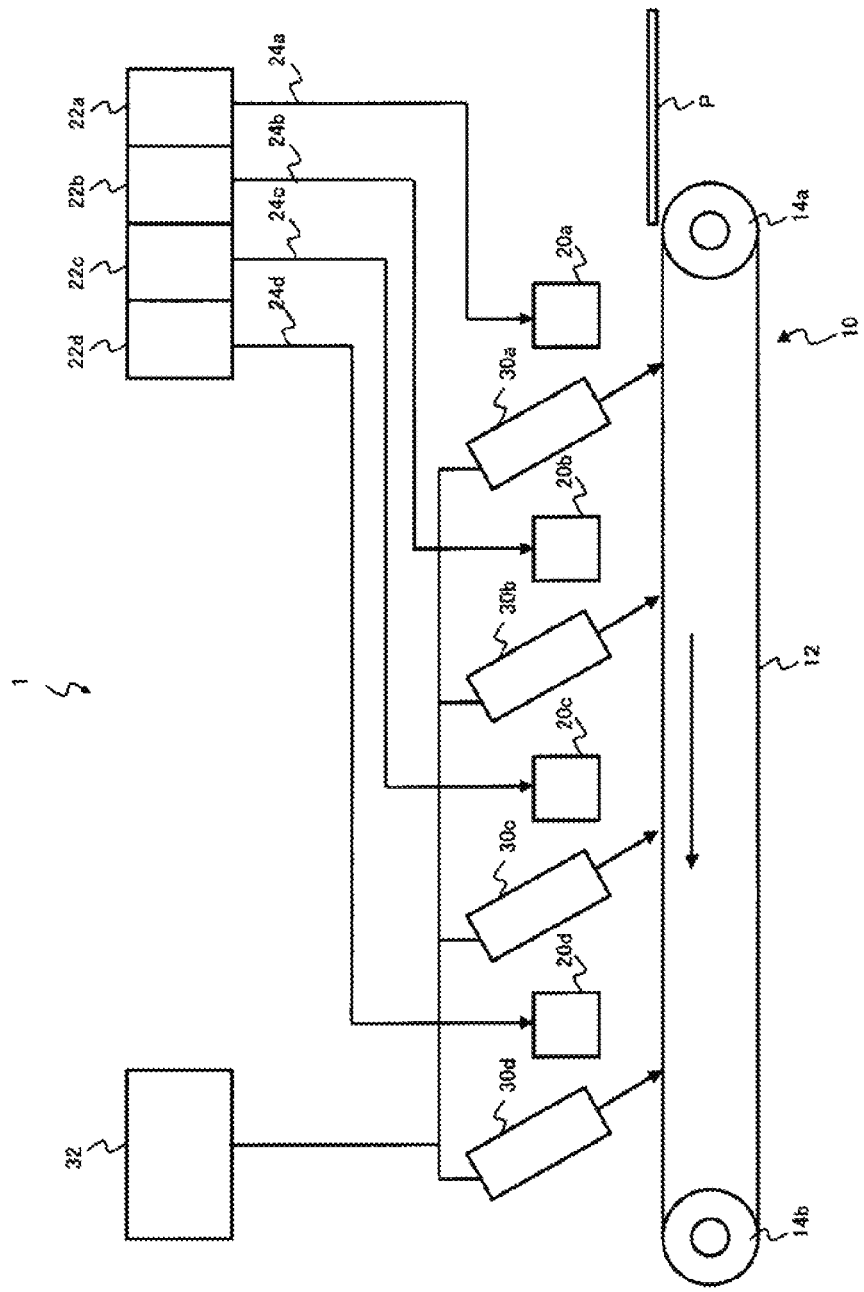
FIG. 1 is a schematic configuration diagram showing an example of an ink jet recording apparatus according to an exemplary embodiment of the invention.

An exemplary embodiment of the invention will be explained below. The exemplary embodiment is an example of carrying out the invention and the invention is not limited to the exemplary embodiment.

In an aqueous ink jet recording apparatus in which a near-infrared absorbent is added to an ink and the ink is dried and fixed by near-infrared emission after printing, an emission spectrum of a laser beam source that generates near-infrared is generally narrow in width (for example, a half width of an emission spectrum peak is about 0.1 nm) and in addition, wavelength variations may occur (for example, width variations of an emission spectrum peak wavelength is about 5 nm). An absorption spectrum peak of the near-infrared absorbent is generally broad in width, but if the emission spectrum peak wavelength of the laser beam source is 5 nm, absorption efficiency of the near-infrared absorbent deteriorates by about 10%, and deterioration of image quality and deterioration of fixing performance of an image may occur.

The present inventors have found that by making a change in the absorption spectrum of the near-infrared absorbent of the ink to be small within a change range of wavelengths of the emission spectrum of the laser beam source that generates near-infrared, that is, by setting a continuous range of wavelengths in which an absorption amount of the ink is not less than 80% of a maximum absorption amount of the ink in a near-infrared region to 10 nm or more, even if emission wavelength variations of the laser occur, deterioration of image quality and deterioration of fixing performance of an image are prevented. Even if the emission wavelength variations of the laser occur, stable heating in which a heating temperature of the ink is unlikely to be changed is possible by making a change in an absorption amount of the ink to be small within a range of wavelength variations. This is especially effective in a case of using plural lasers such as a vertical cavity surface emitting laser (VCSEL) as the laser beam source that generates near-infrared.

A method for making a spectrum close to an ideal condition such that a continuous range of wavelengths in which an absorption amount of the ink is not less than 80% of a maximum absorption amount of the ink in a near-infrared region becomes 10 nm or more, and specifically preferably, a continuous range of wavelengths in which an absorption amount of the ink is not less than 90% of a maximum absorption amount of the ink in a near-infrared region becomes 20 nm or more, may be obtained by using a single near-infrared absorbent, which is favorable, but instead of using the single near-infrared absorbent, for example, there is a method that broadens a width of an absorption spectrum peak by mixing two or more near-infrared absorbents having different absorption spectrum peak wavelengths (for example, the near-infrared absorbents having close absorption spectrum peak wavelengths).

Examples of a combination of the near-infrared absorbents whose absorption spectrum peak wavelengths are different include the following (i), (ii), and (iii).

(i) Two or more different near-infrared absorbents, for example, two or more near-infrared absorbents having the same skeleton and different functional group are mixed to be used. That is, the ink contains two or more different near-infrared absorbents as the near-infrared absorbent.

(ii) Two or more near-infrared absorbent dispersions in which the ratio of the near-infrared absorbent to a resin dispersant that is used to disperse the near-infrared absorbent is different, are mixed to be used. That is, the ink contains a mixture of "two or more near-infrared absorbent dispersions that contain the near-infrared absorbent and the resin dispersant and in which the ratio of the near-infrared absorbent to the resin dispersant is different".

(iii) Two or more near-infrared absorbent dispersions in which the near-infrared absorbent is dissolved by different organic solvents (may remove the organic solvent if required) to become a water dispersion, are mixed to be used. That is, the ink contains a mixture of "two or more near-infrared absorbent dispersions that contain the near-infrared absorbent and contain different organic solvents to be dispersed".

Aqueous Ink for Ink Jet Recording

An aqueous ink for ink jet recording according to the exemplary embodiment contains water, a water-soluble organic solvent, a coloring material, and a near-infrared absorbent, in which a continuous range of wavelengths in which an absorption amount of the ink is not less than 80% of a maximum absorption amount of the ink in a near-infrared region is 10 nm or more. In addition, a continuous range of wavelengths in which an absorption amount of the ink is not less than 80% of a maximum absorption amount of the ink in a near-infrared region is preferably 20 nm or more, a continuous range of wavelengths in which an absorption amount of the ink is not less than 90% of a maximum absorption amount of the ink in a near-infrared region is more preferably 10 nm or more, and a continuous range of wavelengths in which an absorption amount of the ink is not less than 90% of a maximum absorption amount of the ink in a near-infrared region is further more preferably 20 nm or more. Hereinafter, each component contained in the aqueous ink for ink jet recording according to the exemplary embodiment will be described.

Near-Infrared Absorbent

The aqueous ink for ink jet recording according to the exemplary embodiment contains the near-infrared absorbent. As long as the near-infrared absorbent in the aqueous ink for ink jet recording according to the exemplary embodiment is a compound having a maximum absorption wavelength in a range of 750 nm to 950 nm, it is not particularly limited. Examples of the near-infrared absorbent include a squarylium compound, a phthalocyanine compound, an onium compound, a cyanine compound, a nickel complex, and the like, each having the maximum absorption wavelength in a range of 750 nm to 950 nm, and among these, the squarylium compound is preferable from the viewpoint of high absorption efficiency of near-infrared.

As the squarylium compound, a squarylium compound having a structure represented by the following formula (I) is preferable.

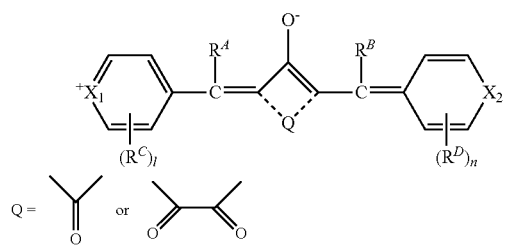

(I)

In formula (I), $X_1$ and $X_2$ each independently represent an oxygen atom, a sulfur atom, a selenium atom, or a tellurium atom, $R^A$ and $R^B$ each independently represent a hydrogen atom or an alkyl group having 1 carbon atom (methyl group), $R^C$ and $R^D$ each independently represent a monovalent substituent, and l and n each independently represent an integer of 0 to 4.

In formula (I), $X_1$ and $X_2$ is more preferably a sulfur atom, $R^A$ and $R^B$ is more preferably a hydrogen atom, $R^C$ and $R^D$ is preferably a linear or branched alkyl group having 1 to 6 carbon atoms, and l and n is more preferably an integer of 0 to 2, and Q is more preferably a

In formula (I), examples of the monovalent substituent include an alkyl group (such as a methyl group, an ethyl group, an isopropyl group, a t-butyl group, a methoxyethyl group, a methoxyethoxyethyl group, a 2-ethylhexyl group, a 2-hexyldecyl group or a benzyl group), and an aryl group (such as a phenyl group, a 4-chlorophenyl group, a 2, 6-dimethylphenyl group), and the alkyl group is preferable and the t-butyl group is more preferable.

Among these, as the squarylium compound, a squarylium compound having a structure represented by the following formula (II) is preferable.

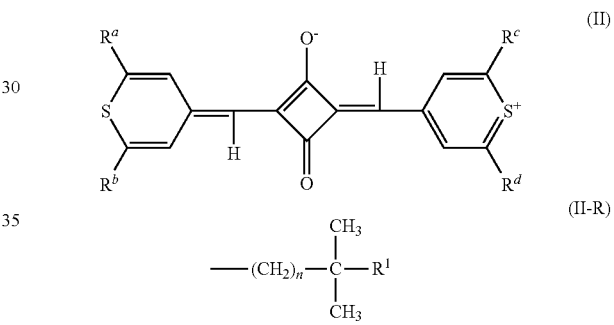

In formula (II), $R^a$, $R^b$, $R^c$, and $R^d$ each independently represent a structure represented by formula (II-R) or an unbranched alkyl group having 1 to 6 carbon atoms which is not branched, $R^1$ represents a hydrogen atom (H) or a methyl group, n represents an integer of 0 to 3, and total number of carbon atoms in the structure represented by formula (II-R) is 6 or less. In formula (II), $R^a$, $R^b$, $R^c$, and $R^d$ are each independently preferably the structure represented by formula (II-R), $R^1$ is preferably a methyl group, and n is preferably an integer of 0 or 1.

The near-infrared absorbent exhibits an excellent absorption property with respect to near-infrared having a center wavelength of 750 nm to 950 nm, particularly near-infrared in a range of 800 nm to 850 nm, is unlikely to be decomposed over time, and also exhibits excellent dispersion stability in water.

Examples of the near-infrared absorbent include a near-infrared absorbent represented by the following formulas (A) and (B). The near-infrared absorbent represented by the following formula (A) has a structure where $R^a$, $R^b$, $R^c$, and $R^d$ are represented by formula (II-R), $R^1$ is a methyl group, and n is 0 in formula (II) above. The near-infrared absorbent represented by the following formula (B) has a structure where $R^a$, $R^b$, $R^c$, and $R^d$ are represented by formula (II-R), $R^1$ is a methyl group, and n is 1 in formula (II) above.

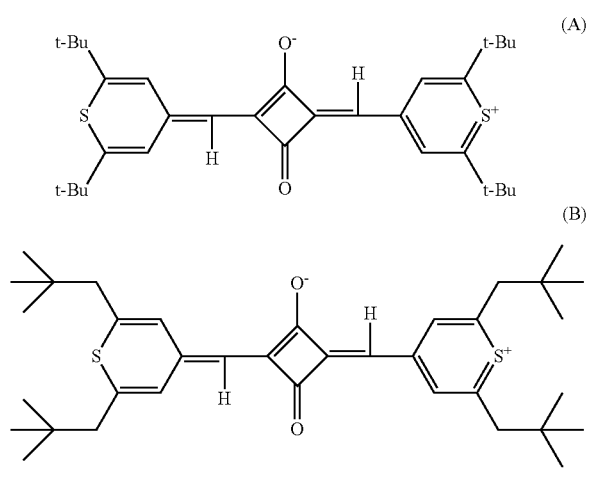

The content of the near-infrared absorbent in the aqueous ink for ink jet recording according to the exemplary embodiment may be determined in accordance with a desired absorption amount of the near-infrared or the like. The content of the near-infrared absorbent is in a range of, for example, 0.001% by weight to 0.5% by weight with respect to the total ink, and a range of 0.005% by weight to 0.3% by weight is more preferable. If the content of the near-infrared absorbent in the aqueous ink for ink jet recording is less than 0.001% by weight, there is a case where the absorption amount of the near-infrared is insufficient, and if the content exceeds 0.5% by weight, there is a case where the color tone of the ink is affected, dispersibility deteriorates and the ink agglomerates, or the near-infrared absorbent is precipitated.

Resin Dispersant

The aqueous ink for ink jet recording according to the exemplary embodiment further contains a resin dispersant, and it is preferable that the near-infrared absorbent is dispersed in the ink by the resin dispersant. Because the near-infrared absorbent has low solubility in water or is insoluble, it is preferable that fine particles are dispersed in water using the resin dispersant.

The phrases "dispersed" and "fine particles are dispersed" mean that the dispersion is performed in the state where a volume average particle diameter of the near-infrared absorbent in the ink is in a range of, for example, 1 nm to 150 nm, and preferably in a range of 3 nm to 80 nm. If the volume average particle diameter of the ink is measured by using a laser diffraction-type particle size distribution measuring device, because a particle size distribution peak of a coloring material (pigment) and a particle size distribution peak of the near-infrared absorbent are separated in general, it may be determined that the near-infrared absorbent is dispersed in water by the resin dispersant by the above volume average particle diameter.

Examples of the resin dispersant include one from the related art. Any one of a water-insoluble resin, a water dispersion (self emulsification) resin, and a water-soluble resin may be included, but the water-insoluble resin and the water dispersion (self emulsification) resin are preferable from the viewpoint of ease in preparation of the near-infrared absorbent dispersion or the like, and the water dispersion (self emulsification) resin is preferable from the viewpoint of the dispersion stability or the like. If the resin dispersant is the water-soluble resin, there is a case where the near-infrared absorbent is dispersed in the ink and is unlikely to become emulsified.

The resin dispersant of the water dispersion (self emulsification) resin is preferable at least one selected from the following (a) to (g).

(a) Polyurethane
(b) Polyester
(c) Polyamide
(d) Polyurea
(e) Polycarbonate
(f) A vinyl polymer that contains a structural unit (repeating unit) represented by the following formula (III) and a structural unit derived from alkyl (meth)acrylate, and in which an acid value is 6 mg KOH/g to 100 mg KOH/g.

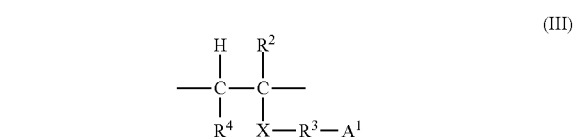

(III)

In formula (III), $R^2$ represents a hydrogen atom (H), a methyl group, or —X—$R^3$-$A^1$, $R^4$ represents a hydrogen atom or —X—$R^3$-$A^1$, X represents —C(=O)—, —C(=O)O—, —C(=O) NH—, —OC(=O)—, phenylene, a divalent group corresponding to a heterocyclic ring, or a single bond, $R^3$ represents a divalent linking group or a single bond, $A^1$ represents —$SO_3H$, —COOH, or —$OPO_3H_2$. In a repeating unit represented by formula (III), in a case where two or more of —X—$R^3$-$A^1$'s are present in the same unit, X, $R^3$, or $A^1$ may be the same as or different from each other. Plural units having different structures may be present in the same molecule.

(g) A polymer that contains a structural unit in which at least one has a carboxy group as a hydrophilic structural unit, and a structural unit derived from alkyl (meth)acrylate, and in which the acid value is 15 mg KOH/g to 150 mg KOH/g.

(f) Examples of the structural unit represented by formula (III) above in the vinyl polymer include acrylic acid ($R^2$=$R^4$=H, X=$R^3$=single bond, $A^1$=—COOH), methacrylic acid ($R^2$=—$CH_3$, $R^4$=H, X=$R^3$=single bond, $A^1$=—COOH), 2-carboxyethyl acrylate (β-carboxyethyl acrylate) ($R^2$=$R^4$=H, X=—C(=O)O—, $R^3$=—$CH_2CH_2$—, $A^1$=—COOH), styrene carboxylic acid ($R^2$=$R^4$=H, X=phenylene, $R^3$=single bond, $A^1$=—COOH), 2-acrylamido-2-methylpropanesulfonic acid ($R^2$=$R^4$=H, X=—C(=O) NH—, $R^3$=—C(—$CH_3$)$_2$—$CH_2$—, $A^1$=—$SO_3H$), sodium styrene sulfonic acid ($R^2$=$R^1$=H, X=phenylene, $R^3$=single bond, $A^1$=—$SO_3H$ (or —$SO_3Na$)), phosphoric acid mono 2-(meth)acryloylethyl ($R^2$=$CH_3$, $R^4$=H, X=—C(=O)O—, $R^3$=—$CH_2CH_2$—, $A^1$=—$OPO_3H_2$), itaconic acid ($R^2$=—COOH [X=$R^3$=single bond, $A^1$=—COOH], $R^4$=H, X=single bond, $R^3$=—$CH_2$—, $A^1$=—COOH), maleic acid ($R^2$=H, $R^4$=—COOH[X=$R^3$=single bond, $A^1$=—COOH], X=$R^3$=single bond, $A^1$=—COOH), and the like. In the structural unit represented by formula (III) above, the number of —X—$R^3$-$A^1$ is preferably 1.

(f) Examples of the structural unit derived from alkyl (meth)acrylate in the vinyl polymer ("alkyl (meth)acrylate" means "alkyl acrylate" or "alkyl methacrylate") include methyl (meth)acrylate, ethyl (meth)acrylate, butyl (meth)acrylate, isobutyl (meth)acrylate, methoxyethyl (meth)acrylate, phenoxyethyl (meth)acrylate, benzyl (meth)acrylate, methoxytriethylene glycol (meth)acrylate, ethoxytriethylene glycol (meth)acrylate, and the like.

(f) Examples of the divalent linking group in the vinyl polymer include an alkylene group having 1 to 5 carbon atoms such as a methylene group, an ethylene group, a propylene group, and a 1,1-dimethylethylene group.

(f) Examples of the divalent group corresponding to a heterocyclic ring in the vinyl polymer include a divalent group of pyridine, a divalent group of morpholine, and the like.

(f) The acid value of the vinyl polymer is in a range of 6 mg KOH/g to 100 mg KOH/g, preferably in a range of 10 mg KOH/g to 100 mg KOH/g, and more preferably in a range of 10 mg KOH/g to 90 mgKOH/g.

(g) Examples of the structural unit in which at least one has a carboxy group as the above hydrophilic structural unit in the polymer include acrylic acid, methacrylic acid, and the like.

(g) The acid value of the vinyl polymer is in a range of 15 mg KOH/g to 150 mg KOH/g, preferably in a range of 20 mg KOH/g to 130 mg KOH/g, and more preferably in a range of 30 mg KOH/g to 100 mg KOH/g.

From the viewpoint of compatibility with the near-infrared absorbent, dispersion stability, or the like, the resin dispersant is preferably (a) polyurethane, (b) polyester, and (f) the above vinyl polymer, and is more preferably (f) the above vinyl polymer and (b) polyester. The resin dispersant may be used alone or two or more may be used in combination.

The acid value of (a) polyurethane and (b) polyester is in a range of 5 mg KOH to 150 mg KOH/g, but is preferably in a range of 10 mg KOH/g to 120 mg KOH/g from the viewpoint of emulsifiability of the resin, the dispersibility of the near-infrared absorbent, or the like.

A weight-average molecular weight of the resin dispersant is preferably in a range of, for example, 3,000 to 200,000, more preferably in a range of 5,000 to 150,000, further more preferably in a range of 10,000 to 100,000. By setting the weight-average molecular weight of the resin dispersant to 3,000 or more, an amount of water-soluble component is effectively prevented, and if the weight-average molecular weight is 200,000 or less, the dispersion stability of the near-infrared absorbent may be enhanced.

If the acid value of the resin dispersant is less than the above lower limit value, the near-infrared absorbent is unlikely to become dispersed in the ink, and if the value exceeds the above upper limit value, the resin dispersant becomes water soluble, and there is a case where the near-infrared absorbent is unlikely to become dispersed in the ink and emulsified.

Specific examples of (a) polyurethane, (b) polyester, (c) polyamide, (d) polyuria, and (e) polycarbonate, which are the resin dispersants, are described below.

PA-1: 4,4'-diphenylmethane diisocyanate/hexamethylene diisocyanate/tetraethylene glycol/ethylene glycol/2,2-bis (hydroxymethyl) propionic acid (40/10/20/20/10 (molar ratio, the same shall apply hereinafter))

PA-2: 4,4'-diphenylmethane diisocyanate/hexamethylene diisocyanate/butanediol/ethylene glycol/2,2-bis(hydroxymethyl) propionic acid (40/10/20/20/10)

PA-3: 1,5-naphthylene diisocyanate/butanediol/2,2'-bis (4-hydroxyphenyl) propane/polypropylene glycol (Mw=400)/2,2-bis(hydroxymethyl) propionic acid (50/20/5/10/15)

PA-4: 1,5-naphthylene diisocyanate/hexamethylene diisocyanate/2,2-bis(hydroxymethyl) butanoic acid/polybutylene oxide (Mw=500) (35/15/25/25)

PA-5: isophorone diisocyanate/diethylene glycol/neopentyl glycol/2,2-bis(hydroxymethyl) propionic acid (50/20/20/10)

PA-6: toluene diisocyanate/2,2-bis(hydroxymethyl) butanoic acid/polyethylene glycol (Mw=1,000)/cyclohexane dimethanol (50/10/10/30)

PA-7: toluene diisocyanate/ethylene glycol/1,4-butanediol/2,4-di(2-hydroxy) ethyloxycarbonylbenzenesulfonic acid (50/15/32/3)

PA-8: isophorone diisocyanate/diethylene glycol/neopentyl glycol/2,4-di(2-hydroxy) ethyloxycarbonylbenzenesulfonic acid (50/20/25/5)

PA-9: diphenylmethane diisocyanate/hexamethylene diisocyanate/tetraethylene glycol/butanediol/2,4-di(2-hydroxy) ethyloxycarbonylbenzenesulfonic acid (40/10/10/33/7)

PA-10: diphenylmethane diisocyanate/hexamethylene diisocyanate/butanediol/ethylene glycol/2,2-bis(hydroxymethyl) butanoic acid/2,4-di(2-hydroxy) ethyloxycarbonylbenzenesulfonic acid (40/10/20/15/10/5)

PA-11: terephthalic acid/isophthalic acid/cyclohexanedimethanol/1,4-butanediol/ethylene glycol (25/25/25/15/10)

PA-12: terephthalic acid/isophthalic acid/2,2'-bis(4-hydroxyphenyl) propane/tetraethylene glycol/ethylene glycol (30/20/20/15/15)

PA-13: terephthalic acid/isophthalic acid/cyclohexanedimethanol/neopentyl glycol/diethylene glycol (20/30/25/15/10)

PA-14: terephthalic acid/isophthalic acid/4,4'-benzenedimethanol/diethylene glycol/neopentyl glycol (25/25/25/15/10)

PA-15: terephthalic acid/isophthalic acid/5-sulfoisophthalic acid/ethylene glycol/neopentyl glycol (24/24/2/25/25)

PA-16: terephthalic acid/isophthalic acid/5-sulfoisophthalic acid/cyclohexanedimethanol/1,4-butanediol/ethylene glycol (22/22/6/25/15/10)

PA-17: isophthalic acid/5-sulfoisophthalic acid/cyclohexane dimethanol/ethylene glycol (40/10/40/10)

PA-18: cyclohexanedicarboxylic acid/isophthalic acid/2,4-di(2-hydroxy) ethyloxycarbonylbenzenesulfonic acid/cyclohexanedimethanol/ethylene glycol (30/20/5/25/20)

PA-19: 12-aminododecanoic acid (100)

PA-20: reactant of poly(12-aminododecanoic acid) and maleic anhydride

PA-21: 11-aminoundecanoic acid/7-aminoheptanoic acid (50/50)

PA-22: tetramethylenediamine/adipic acid (50/50)

PA-23: hexamethylenediamine/sebacic acid (50/50)

PA-24: N,N-dimethylethylenediamine/adipic acid/cyclohexanedicarboxylic acid (50/20/30)

PA-25: toluene diisocyanate/hexamethylene diamine/2,2-bis(hydroxymethyl) propionic acid (50/40/10)

PA-26: isophorone diisocyanate/poly(oxytetramethylene) glycol: number average molecular weight 2,000/neopentyl glycol/dimethylolpropionic acid (50/13.4/28.4/12.2)

PA-27: isophorone diisocyanate/polypropylene glycol: number average molecular weight 1,000/neopentyl glycol/dimethylolpropionic acid (50/20/15/15)

PA-28: isophorone diisocyanate/poly(oxytetramethylene) glycol: number average molecular weight 2,000/triethylene glycol/2,4-di(2-hydroxy) ethyloxycarbonylbenzenesulfonic acid (50/20/18/12)

PA-29: isophorone diisocyanate/poly(oxytetramethylene) glycol (Mn 2,000)/neopentyl glycol/2,2-bis(hydroxymethyl) propionic acid (50/9.5/6.2/34.3).

Specific examples of (f) a vinyl polymer that is the resin dispersant are described below.

PV-01: phenoxyethyl acrylate/methyl methacrylate/acrylic acid/acrylic acid-2-carboxyethyl copolymer (50/44/1/5)

PV-02: phenoxyethyl acrylate/benzyl methacrylate/isobutyl methacrylate/styrene carboxylic acid copolymer (30/35/25/10)

PV-03: phenoxyethyl methacrylate/isobutyl methacrylate/2-acrylamide-2-methylpropanesulfonic acid copolymer (50/44/6)

PV-04: styrene/butyl acrylate/ethyl methacrylate/acrylic acid-2-carboxyethyl copolymer (30/15/49/6)

PV-05: styrene/butyl acrylate/ethyl methacrylate/sodium styrene sulfonate copolymer (30/20/44/6)

PV-06: styrene/phenoxyethyl acrylate/methyl methacrylate/acrylic acid-2-carboxyethyl copolymer (10/50/35/5)

PV-07: benzyl acrylate/methyl methacrylate/acrylic acid-2-carboxyethyl copolymer (55/40/5)

PV-08: phenoxyethyl methacrylate/benzyl acrylate/styrene carboxylic acid copolymer (45/47/8)

PV-09: styrene/phenoxyethyl acrylate/butyl methacrylate/acrylic acid-2-carboxyethyl copolymer (5/48/40/7)

PV-10: benzyl methacrylate/phenoxyethyl methacrylate/methyl methacrylate/mono 2-(meth)acryloylethyl phosphate copolymer (30/30/30/10)

PV-11: benzyl acrylate/methyl methacrylate/butyl acrylate/2-acrylamide-2-methyl propane sulfonic acid copolymer (12/50/30/8)

PV-12: styrene/ethyl methacrylate/acrylic acid-2-carboxyethyl copolymer (30/60/10)

PV-13: styrene/phenoxyethyl methacrylate/butyl acrylate/acrylic acid-2-carboxyethyl copolymer (15/76/5/4)

PV-14: methyl methacrylate/phenoxyethyl methacrylate/benzyl acrylate/acrylic acid-2-carboxyethyl copolymer (50/30/15/5)

PV-15: methyl methacrylate/butyl methacrylate/2-acrylamide-2-methyl propane sulfonic acid copolymer (56/40/4)

PV-16: benzyl acrylate/acrylic acid-2-carboxyethyl copolymer (90/10)

PV-17: methyl methacrylate/methoxyethyl acrylate/benzyl methacrylate/itaconic acid copolymer (44/15/35/6)

PV-18: ethyl methacrylate/styrene/maleic acid copolymer (46/50/4)

PV-19: methyl methacrylate/benzyl methacrylate/methoxypolyethylene glycol methacrylate (n=23)/2-acrylamide-2-methylpropanesulfonic acid copolymer (74/15/5/6)

PV-20: benzyl methacrylate/ethoxy triethylene glycol methacrylate/mono 2-(meth)acryloylethyl phosphate copolymer (65/30/5)

PV-21: methyl methacrylate/butyl acrylate/acrylic acid-2-carboxyethyl copolymer (75/19/6)

PV-22: phenoxyethyl acrylate/benzyl methacrylate/isobutyl methacrylate/styrene sulfonic acid copolymer (30/35/29/6)

PV-23: benzyl methacrylate/ethyl methacrylate/β-carboxyethyl acrylate copolymer (60/25/15)

PV-24: phenoxyethyl methacrylate/ethyl methacrylate/methacrylic acid copolymer (50/38/12)

PV-25: benzyl methacrylate/ethyl methacrylate/β-carboxyethyl acrylate copolymer (60/18/22)

Specific examples of (g) polymer that is the resin dispersant are described below.

P-1: n-butyl acrylate/acrylic acid copolymer (80/20)

P-2: methyl methacrylate/isobutyl methacrylate/acrylic acid copolymer (52/28/20)

P-3: sec-butyl acrylate/acrylic acid copolymer (85/15)

P-4: n-butyl methacrylate/pentyl methacrylate/methacrylic acid copolymer (38/38/24)

P-5: isobutyl acrylate/glycidyl methacrylate/acrylic acid copolymer (75/15/10)

P-6: isopropyl acrylate/acrylic acid copolymer (90/10)

P-7: butyl methacrylate/2-hydroxyethyl methacrylate/acrylic acid copolymer (85/5/10)

P-8: n-butyl methacrylate/1H,1H,2H,2H-perfluorodecyl acrylate/acrylic acid copolymer (75/20/5)

P-9: methyl methacrylate/n-butyl acrylate/acrylic acid copolymer (50/45/5)

P-10: isobutyl methacrylate/methacrylic acid ester of polyethylene glycol monomethyl ether (repeating number of ethyleneoxy chain: 9)/acrylic acid copolymer (80/10/10)

P-11: styrene/ethyl methacrylate/methacrylic acid copolymer (30/62/8)

P-12: styrene/ethyl methacrylate/methacrylic acid copolymer (40/45/15)

The content of the resin dispersant in the aqueous ink for ink jet recording according to the exemplary embodiment may be determined in accordance with the dispersibility of the near-infrared absorbent or the like. The content of the resin dispersant in the aqueous ink for ink jet recording is in a range of, for example, 0.001% by weight to 10% by weight, and more preferably in a range of 0.002% by weight to 7% by weight with respect to the total ink. If the content of the resin dispersant is less than 0.001% by weight, there is a case where the near-infrared absorbent is insufficiently dispersed, and if the content exceeds 10% by weight, there is a case where clogging at the end of a nozzle or deterioration in roller offset occurs.

Coloring Material

The aqueous ink for ink jet recording according to the exemplary embodiment contains a coloring material. As this coloring material, pigments or dyes applied to various types of inks are used, but the pigments are preferable from the viewpoint of light fastness, heat resistance or the like.

Specific examples of the pigments include a cyan pigment such as C.I. Pigment Blue 1, 2, 3, 4, 5, 6, 7, 10, 11, 12, 13, 14, 15, 15:1, 15:2, 15:3, 15:4, 15:6, 16, 17, 23, 60, 65, 73, 83 and 180, C.I. Bat Cyan 1, 3, and 20, Prussian blue, cobalt blue, alkali blue lake, phthalocyanine blue, metal-free phthalocyanine blue, partially chlorinated phthalocyanine blue, Fast Sky Blue, and Indanthrene Blue BC, as the cyan pigment.

Examples of a magenta pigment include a magenta pigment such as C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 184, 202, 206, 207, and 209, and Pigment Violet 19. In addition, the examples thereof include magenta dyes such as C.I. Solvent Red 1, 3, 8, 23, 24, 25, 27, 30, 49, 81, 82, 83, 84, 100, 109, and 121, C.I. Disperse Red 9, and C.I. Basic Red 1, 2, 9, 12, 13, 14, 15, 17, 18, 22, 23, 24, 27, 29, 32, 34, 35, 36, 37, 38, 39, and 40, Bengara, cadmium red, red lead, mercury sulfide, permanent red 4R, lithol red, pyrazolone red, watching red, calcium salt, lake red D, brilliant carmine 6B, eosin lake, rhodamine lake B, alizarin lake, brilliant carmine 3B, and the like.

Examples of a yellow pigment include C.I. Pigment Yellow 2, 3, 15, 16, 17, 97, 180, 185, 139, and the like.

Examples of a black pigment used for a black ink include a carbon pigment such as carbon black. Because the carbon pigment has a high level of absorption ability of the near-infrared, there is no need for additionally adding the near-infrared absorbent. In such a case, the carbon pigment is a component that serves as both the coloring material and the near-infrared absorbent.

The content of the coloring material in the aqueous ink for ink jet recording according to the exemplary embodiment may be determined in accordance with the hue required for the ink, or the like. The content of the coloring material is in a range of, for example, 0.5% by weight to 10% by weight, and preferably in a range of 1% by weight to 8% by weight with respect to the total ink. If the content of the coloring material is less than 0.5% by weight, there is a case where color is insufficiently developed on a recording medium, and if the content exceeds 10% by weight, there is a case where ink storage life shortens or a head is clogged.

pH Adjuster

A pH adjuster may be used to adjust a pH of the aqueous ink for ink jet recording according to the exemplary embodiment to a predetermined pH range, for example, 6.5 to 8.5. The pH adjuster is not particularly limited as long as the adjuster may adjust the pH to a predetermined pH range, but various pH buffers may be used. Examples of the pH buffers include Good buffers, sodium dihydrogen phosphate-disodium hydrogen phosphate, potassium dihydrogen phosphate-sodium hydroxide, boric acid-potassium chloride-sodium hydroxide, and the like, but the Good buffers are preferable in consideration of pH stability over time and prevention of deterioration in a head component, and the like. Examples of the Good buffers include MES, ADA, PIPES, ACES, colamine hydrochloride, BES, TES, HEPES, acetamidoglycine, tricine, glycinamide, bicine, and the like.

Solvent

As a solvent in the aqueous ink for ink jet recording according to the exemplary embodiment, a water-soluble organic solvent may be used in addition to water. Examples of the water-soluble organic solvent include polyols such as ethylene glycol, diethylene glycol, triethylene glycol, tetraethylene glycol, polyethylene glycol, propylene glycol, dipropylene glycol, tripropylene glycol, 1,3-propanediol, 1,3-butanediol, 2,3-butanediol, 1,4-butanediol, 3-methyl-1,3-butanediol, 1,5-pentanediol, 3-methyl-1,5-pentanediol, 2-methyl-2,4-pentanediol, 1,2-hexanediol, 1,6-hexanediol, glycerin, 1,2,3-butanetriol, 1,2,4-butanetriol, 1,2,6-hexanetriol, and petriol; polyol alkyl ethers such as ethylene glycol monoethyl ether, ethylene glycol monobutyl ether, diethylene glycol monomethyl ether, diethylene glycol monoethyl ether, diethylene glycol monoisopropyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, and ε-caprolactam; amides such as formamide, N-methylformamide, and N,N-dimethylformamide; amines such as monoethanolamine, diethanolamine, triethanolamine, monoethylamine, diethylamine, and triethylamine; sulfur-containing compounds such as dimethyl sulfoxide, sulfolane, and thiodiethanol; propylene carbonate, ethylene carbonate, and the like. Among these, one may be used alone and two or more may be used in combination.

Among these, in consideration of prevention of a property defect in solubility and ejection due to water evaporation, propylene glycol, diethylene glycol monoisopropyl ether, 1,2-hexanediol, ethylene glycol, diethylene glycol, 1,3-propanediol, diethylene glycol monobutyl ether, diethylene glycol mono n-propyl ether, propylene glycol monomethyl ether, 2-pyrrolidone, 2,3-butanediol, and the like are preferable.

The content of water of the aqueous ink for ink jet recording according to the exemplary embodiment is in a range of, for example, 40% by weight to 90% by weight with respect to the total ink. The content of the water-soluble organic solvent in the aqueous ink for ink jet recording according to the exemplary embodiment is in a range of, for example, 3% by weight to 50% by weight, and preferably in a range of 5% by weight to 40% by weight with respect to the total ink. If the content of the water-soluble organic solvent is less than 3% by weight, a nozzle is likely to become dry and there is a case where a discharge defect of a droplet occurs, and if the content exceeds 50% by weight, ink viscosity increases, and there is a case where the viscosity exceeds a proper viscosity range.

Other Component

The aqueous ink for ink jet recording according to the exemplary embodiment may contain a pigment dispersant for dispersing a pigment that is a coloring material, an emulsion for improving fixability and the like, a surfactant, and other components, in addition to the above described near-infrared absorbent and coloring material. Regarding the other components, various components of the related art may be used using a known additional ratio.

Examples of the pigment dispersant include a polymeric dispersant, an anionic surfactant described below, a cationic surfactant, an amphoteric surfactant, a nonionic surfactant, and the like. The polymeric dispersant is particularly preferable in terms of the dispersion stability of the pigment.

As the polymeric dispersant, a polymer having a hydrophilic structure portion and a hydrophobic structure portion is suitably used. As the polymer having the hydrophilic structure portion and the hydrophobic structure portion, a condensation polymer and an addition polymer are used, for example. Examples of the condensation polymer include a known polyester-type dispersant. Examples of the addition polymer include an addition polymer of a monomer having an α,β-ethylenically unsaturated group. A desired polymeric dispersant is obtained by combining a monomer having an α,β-ethylenically unsaturated group having a hydrophilic group and a monomer having an α,β-ethylenically unsaturated group having a hydrophobic group to make a copolymer.

Furthermore, a homopolymer of the monomer having an α,β-ethylenically unsaturated group having a hydrophilic group is also used.

Examples of the monomer having an α,β-ethylenically unsaturated group having a hydrophilic group include a monomer having a carboxyl group, a sulfonic acid group, a hydroxyl group, a phosphoric acid group or the like, such as acrylic acid, methacrylic acid, crotonic acid, itaconic acid, itaconic acid monoester, maleic acid, maleic acid monoester, fumaric acid, fumaric acid monoester, vinylsulfonic acid, styrenesulfonic acid, sulfonated vinylnaphthalene, vinyl alcohol, acrylamide, methacryloxyethyl phosphate, bismethacryloxyethyl phosphate, methacryloxyethyl phenyl acid phosphate, ethylene glycol dimethacrylate, and diethylene glycol dimethacrylate.

Examples of the monomer having an α,β-ethylenically unsaturated group having a hydrophobic group include styrene derivatives such as styrene, α-methylstyrene, and vinyltoluene, vinylcyclohexane, vinylnaphthalene, vinylnaphthalene derivatives, acrylic acid alkyl ester, methacrylic acid alkyl ester, methacrylic acid phenyl ester, methacrylic acid cycloalkyl ester, crotonic acid alkyl ester, itaconic acid dialkyl ester, maleic acid dialkyl ester, and the like.

Preferable examples of the copolymer as the polymeric dispersant include a styrene-styrene sulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinyl naphthalene-acrylic acid copolymer, an acrylic acid alkyl ester-acrylic acid copolymer, a methacrylic acid alkyl ester-methacrylic acid copolymer, a styrene-methacrylic acid alkyl ester copolymer, a styrene-acrylic acid alkyl ester-acrylic acid copolymer, a styrene-methacrylic acid phenyl ester-methacrylic acid copolymer, a styrene-methacrylic acid cyclohexyl ester-methacrylic acid copolymer, or a salt thereof. In addition, a monomer having a polyoxyethylene group and a hydroxyl group may be copolymerized with these polymers.

Among these, a polymeric dispersant selected from the group consisting of a styrene-acrylic acid copolymer and a styrene-acrylate copolymer is preferable, the styrene-acrylate copolymer is more preferable, and a styrene-acrylic acid alkali metal salt copolymer is particularly preferable.

These polymeric dispersants may be used alone and two or more may be used in combination. The content of the polymeric dispersant greatly varies in accordance with a pigment and is not necessarily as below, but the content is preferably 0.1% by weight to 100% by weight with respect to a pigment.

Examples of the surfactant include an anionic surfactant, a nonionic surfactant, a cationic surfactant, an amphoteric surfactant, and the like. The anionic surfactant and the nonionic surfactant are preferable and the nonionic surfactant is more preferable.

Examples of the nonionic surfactant preferably include a surfactant having a "hydrophile-lipophile balance" (HLB) of 14 or less. By adjusting an amount of the surfactant having HLB of 14 or less and using plural surfactants having different HLBs, adjustment of the surface tension of an aqueous ink becomes easy. The "hydrophile-lipophile balance" (HLB) is defined by the following scheme (Griffin method).

HLB=20×(total formula weight of hydrophilic portion/molecular weight)

Examples of such a surfactant include at least one selected from the group consisting of ethylene oxide adduct of acetylene glycol and polyether modified silicone. The ethylene oxide adduct of acetylene glycol is, for example, a compound having an —O—$(CH_2CH_2O)$n-H structure in which ethylene oxide is added to at least one hydroxyl group of acetylene glycol (for example, n represents an integer of 1 to 30).

Examples of commercially available ethylene oxide adduct of acetylene glycol include OLFINE E1004 (7 to 9), OLFINE E1010 (13 to 14), OLFINE EXP.4001 (8 to 11), OLFINE EXP.4123 (11 to 14), OLFINE EXP.4300 (10 to 13), SURFYNOL 104H (4), SURFYNOL 420 (4), SURFYNOL 440 (8), and DYNOL 604 (8) (all manufactured by Nisshin Chemical Industry Co., Ltd.) (numerical value in parentheses indicates the catalog value of HLB).

The polyether modified silicone is a compound in which a polyether group is bonded to a silicone chain in a graft form (polysiloxane main chain), or a compound bonded in a block form, for example. Examples of the polyether group include a polyoxyethylene group and a polyoxypropylene group. The polyether group may be a polyoxyalkylene group in which an oxyethylene group and an oxypropylene group are added in a block form or randomly.

Examples of commercially available polyether modified silicone include SIL SILFACE SAG 002 (12), SILFACE SAG 503A (11), and SILFACE SAG 005 (7) (manufactured by Nisshin Chemical Industry Co., Ltd.) (numerical value in parentheses indicates the catalog value of HLB).

Furthermore, other nonionic surfactants may be used in addition to the ethylene oxide adduct of acetylene glycol and the polyether modified silicone. Examples of the other nonionic surfactants include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkyl amine, polyoxyethylene fatty acid amide, alkyl alkanol amide, polyethylene glycol polypropylene glycol block copolymer, acetylene glycol, and the like.

Among these, polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylolamide, polyethylene glycol polypropylene glycol block copolymer, and acetylene glycol are preferable.

Examples of the nonionic surfactants also include a silicone surfactant such as polysiloxane oxyethylene adduct; a fluorine surfactant such as perfluoroalkyl carboxylate, perfluoroalkyl sulfonate and oxyethylene perfluoroalkyl ether; a biosurfactant such as spiculisporic acid, rhamnolipid, lysolecithin, and the like.

Examples of the anionic surfactant include alkyl benzene sulfonate, alkyl phenyl sulfonate, alkyl naphthalene sulfonate, higher fatty acid salt, sulfate ester salt of higher fatty acid ester, sulfonate salt of higher fatty acid ester, sulfate ester salt and sulfonate salt of higher alcohol ether, higher alkyl sulfosuccinate, polyoxyethylene alkyl ether carboxylate, polyoxyethylene alkyl ether sulfate, alkyl phosphate, polyoxyethylene alkyl ether phosphate, and the like.

Among these, as the anionic surfactant, dodecyl benzene sulfonate, isopropyl naphthalene sulfonate, monobutyl phenyl phenol monosulfonate, monobutyl biphenyl sulfonate, dibutyl phenyl phenol disulfonate, and the like are preferable.

The surfactant may be used alone or two or more may be used in combination.

Examples of the emulsion include polyurethane emulsion, polyacrylate emulsion, and the like.

The content of the emulsion in the aqueous ink for ink jet recording according to the exemplary embodiment is in a range of, for example, 0.1% by weight to 10% by weight with respect to the total ink.

The ink pH of the aqueous ink for ink jet recording according to the exemplary embodiment is preferably in a range of 6.5 to 8.5, and more preferably in a range of 6.7 to 8.2. The above near-infrared absorbent has an excellent property, which is unlikely to be decomposed over time, but in a case where the above near-infrared absorbent is decomposed in water, if the pH of the ink in which the near-infrared absorbent dispersion and the near-infrared absorbent are added exceeds 8.5, the decomposition of the near-infrared absorbent proceeds, and deterioration of the near-infrared absorption efficiency occurs, and therefore the evaporation rate of the ink becomes slower and there is a case where high-speed printing is difficult.

Furthermore, if the ink pH is less than 6.5, the absorption spectrum of a coloring material changes, which leads to unintended color tones. In addition, the dispersion stability of the coloring material and the near-infrared absorbent in water deteriorates and aggregates are formed with the lapse of time, and there is a case where sedimentation or the like occurs. Such phenomenas are not observed in a case of not containing the near-infrared absorbent, and are assumed to be generated by the effect of the interaction of the coloring material and the near-infrared absorbent.

Aqueous Ink Set for Ink Jet Recording

The aqueous ink set for ink jet recording according to the exemplary embodiment is constituted of one or plural color inks that are the above aqueous ink for ink jet recording and in which a coloring material is a chromatic color. In addition, the aqueous ink set for ink jet recording according to the exemplary embodiment is constituted of a black ink including carbon black and the like as the coloring material, and one or plural color inks that are the above aqueous ink for ink jet recording and in which the coloring material is a chromatic color. The "chromatic color" is a color other than an achromatic color having only lightness but having no hue and saturation such as white, black, gray, and the like, and is a color having the hue and saturation in addition to the lightness. The aqueous ink set for ink jet recording is constituted by containing a black ink including carbon black and the like as the coloring material, and one or plural colors of a cyan ink, a magenta ink, and a yellow ink, which are the above aqueous ink for ink jet recording.

Ink Jet Recording Apparatus and Ink Jet Recording Method

An ink jet recording apparatus and an ink jet recording method according to the exemplary embodiment are an ink jet recording apparatus and an ink jet recording method to which the above aqueous ink for ink jet recording and the above aqueous ink set for ink jet recording are applied.

The ink jet recording apparatus according to the exemplary embodiment is an apparatus including a recording head that discharges the aqueous ink for ink jet recording and the aqueous ink set for ink jet recording to apply the ink on a recording medium; and a near-infrared laser emitting device that emits a near-infrared laser having a center wavelength of 750 nm to 950 nm to the ink applied on the recording medium.

The ink jet recording method according to the exemplary embodiment is a method in which after discharging the aqueous ink for ink jet recording or the aqueous ink set for ink jet recording from the recording head to apply the ink on the recording medium, the near-infrared laser having a center wavelength of 750 nm to 950 nm is emitted to perform drying of the ink and recording.

The ink jet recording apparatus and the ink jet recording method according to the exemplary embodiment are favorably applied as, for example, an ink jet recording apparatus and an ink jet recording method in which high-speed printing of 30 sheets/min or more is performed.

As examples of the ink jet recording apparatus in which the aqueous ink for ink jet recording or the aqueous ink set for ink jet recording is installed, and the ink jet recording method, configurations and methods of the following (1) to (3) are considered.

(1) A configuration and a method of performing recording by repeatedly emitting the near-infrared laser having a center wavelength of 750 nm to 950 nm after applying the ink of each color on the recording medium.

For example, after printing black ink on the recording medium using a head for black, the black ink is dried by emitting the near-infrared laser. Thereafter, printing and laser emitting are repeated in a manner of cyan ink printing→laser emitting→magenta ink printing→laser emitting→yellow ink printing→laser emitting. The order of printing inks is not limited thereto, and the location of the laser emitting device during carrying of the recording medium is also not limited thereto.

(2) A configuration and a method of performing ink drying by repeatedly emitting the near-infrared laser having a center wavelength of 750 nm to 950 nm after applying the ink of each color on the recording medium, and after applying the ink to be recorded last on the recording medium, heating the recording medium without emitting the near-infrared laser.

For example, after applying a yellow ink on the recording medium in a manner of black ink printing→laser emitting→cyan ink printing→laser emitting→magenta ink printing→laser emitting→yellow ink printing, the recording medium is heated without emitting the near-infrared laser to perform ink drying. The heating may be performed in a manner of dyeing the entire surface of the recording medium by using a heating device such as a heater dryer. The order of printing inks is not limited thereto, and the location of the laser emitting device and the heating device during carrying of the recording medium is also not limited thereto.

In a case of (2), the last ink applied may not contain the near-infrared absorbent. For example, in a case where the near-infrared absorbent affects the coloring of yellow, if setting the ink to be printed last as the yellow ink and configuring the yellow ink so as not to contain the near-infrared absorbent, the coloring of yellow being affected by the near-infrared absorbent may be avoided.

(3) A configuration and a method of emitting the near-infrared laser having a center wavelength of 750 nm to 950 nm after applying the ink of every color on the recording medium.

For example, black ink printing→cyan ink printing→magenta ink printing→yellow ink printing→laser emitting is performed. The order of printing inks is not limited thereto.

Hereinafter, with reference to drawings, the ink jet recording apparatus according to the exemplary embodiment will be explained. FIG. 1 is a schematic configuration diagram showing an example of the ink jet recording apparatus according to the exemplary embodiment. An ink jet recording apparatus 1 according to the exemplary embodiment shown in FIG. 1 has the configuration and the method of (1). The ink jet recording apparatus 1 includes a carrying unit 10 that carries a recording medium P, four ink jet recording heads 20a, 20b, 20c, and 20d which discharge inks of plural colors on the recording medium P by each color and apply the ink on the recording medium, and four laser emitting units 30a, 30b, 30c, and 30d as a near-infrared laser emitting device that emits a near-infrared laser having a center wavelength of 750 nm to 950 nm to the ink discharged to the recording medium P.

The carrying unit 10 is a unit in which an endless belt 12 is stretched by rollers 14a and 14b. The belt 12 stretched by the rollers 14a and 14b is configured such that at least a region facing a nozzle surface (ink discharging region) of each of the ink jet recording heads 20a, 20b, 20c, and 20d, and an emission region of the near-infrared laser by the laser emitting units 30a, 30b, 30c, and 30d become substantially horizontal. In addition, the belt 12 has a width wider than a maximum width of the recording medium P that is a target of the ink jet recording apparatus 1.

A belt drive motor (not shown) is connected to one or both of the rollers 14a and 14b, and the belt 12 rotatably moves in an arrow direction in FIG. 1 by the power of the motor. The recording medium P such as recording paper supplied on the belt 12 is carried from one side (right side) to the other side (left side) on FIG. 1, in accordance with the rotatable movement of the belt 12.

The four ink jet recording heads 20a, 20b, 20c, and 20d are disposed along a side from an upstream side to a downstream side in a carrying direction of the recording medium P, and each are connected via ink tanks 22a, 22b, 22c, and 22d which store the inks of plural colors by color, and pipe lines 24a, 24b, 24c, and 24d. The ink of each color supplied from each of the ink tanks 22a, 22b, 22c, and 22d is discharged from each of the ink jet recording heads 20a, 20b, 20c, and 20d in this order on the recording medium P carried by the carrying unit 10.

For example, the ink jet recording heads 20a, 20b, 20c, and 20d are configured to contain a head 20a that discharges a black ink from the upstream side in the carrying direction of the recording medium P, a head 20b that discharges a cyan ink, a head 20c that supplies a magenta ink, and a head 20d that discharges a yellow ink. The combination of the inks discharged from each of the ink jet recording heads 20a, 20b, 20c, and 20d is not limited to the above configuration, and as long as the combination has a configuration in which the inks of plural colors are discharged by each color, the combination may be a configuration in which a head that discharges an ink having another hue other than the above four colors is further included (that is, a configuration in which 5 or more heads are present), and the combination may be a configuration in which the hue of the ink to be discharged and the order (discharging order) are different from the above configuration.

For example, a line-type ink jet recording head having a width that is the same as or wider than the width of the recording medium P that is a target of the ink jet recording apparatus 1, is applied to each of the ink jet recording heads 20a, 20b, 20c, and 20d. A scan-type ink jet recording head of the related art may be applied. In addition, regarding discharging method of an ink from each of the ink jet recording heads 20a, 20b, 20c, and 20d, a known method in the related art such as a piezoelectric element driving type, and a heating element driving type is applied.

The four laser emitting units 30a, 30b, 30c, and 30d are disposed in the downstream side in the carrying direction of the recording medium P with respect to each of the ink jet recording heads 20a, 20b, 20c, and 20d. Each of the laser emitting units 30a, 30b, 30c, and 30d has a function of emitting the near-infrared laser, and emission energy of the near-infrared laser, emission timing, oscillation wavelength, and the like are controlled by a laser controller 32.

Regarding each of the laser emitting units 30a, 30b, 30c, and 30d, as long as a near-infrared laser has a center wavelength in a range of 750 nm to 950 nm, and preferably has an oscillation wavelength in a range of 800 nm to 850 nm, the laser is not particularly limited and applied. As such laser emitting units, a near-infrared laser such as a semiconductor laser, a solid laser, a gas laser, and a dye laser is applied, and if a condensing optical system is attached, a high power LED may be used. More specifically, a semiconductor array laser with an oscillation wavelength of 900 nm, a semiconductor array laser with an oscillation wavelength of 810 nm, a semiconductor array laser with an oscillation wavelength of 840 nm, a semiconductor array laser with an oscillation wavelength of 940 nm, a titanium sapphire laser with an oscillation wavelength of 800 nm, and the like are applied. Furthermore, in a case where each of the laser emitting units 30a, 30b, 30c, and 30d has plural lasers such as a vertical cavity surface emitting laser (VCSEL), the aqueous ink for ink jet recording and the aqueous ink set for ink jet recording are favorably applied. In the vertical cavity surface emitting laser, a variation of each emission spectrum is preferably within 20 nm, and a variation of each emission spectrum is more preferably within 10 nm.

The emission conditions of the near-infrared laser by each of the laser emitting units 30a, 30b, 30c, and 30d is not particularly limited as long as the ink is dried, and it is preferable to be able to emit energy to the ink discharged on the recording medium P as thoroughly as possible.

For example, the near-infrared laser may be a laser that is arranged in a line in a direction substantially orthogonal to the carrying direction of the recording medium P, and may be a scan type depending on carrying speed of the recording medium P and the laser output. Furthermore, examples of the emission condition of the near-infrared laser are as below. That is, in a case where beam emission is performed on the recording medium P in a line form, an emission region having this line form may be determined according to a width in the carrying direction of the recording medium P and a width in the direction substantially orthogonal to the carrying direction (that is, a length and a width of the recording medium P). Specifically, the width in the direction substantially orthogonal to the carrying direction of the recording medium P (a width of the recording medium P) is a paper width or a width of a region from which the ink is discharged, and the width in the carrying direction (a length of the recording medium P) is set by the carrying speed and a desired emission time (width=carrying speed×emission time). Furthermore, the emission energy of the near-infrared laser may be determined according to a discharge amount of ink. For example, if a general discharge amount of ink is in a range of 1 g/cm$^2$ to 30 g/cm$^2$, the emission energy may be adjusted to 0.3 J/cm$^2$ to 10 J/cm$^2$ in terms of energy absorbing the ink, and if an absorption rate of laser light of the ink is set to A, a range becomes 0.3/A (J/cm$^2$) to 10/A (J/cm$^2$). The absorption rate A varies according to the order of ink discharging (drying), but is preferably selected from a range of 10- to 100%.

The emission of the near-infrared laser by each of the laser emitting units 30a, 30b, 30c, and 30d is preferably performed immediately after landing of the ink on the recording medium P, from the viewpoint of preventing infiltration of the ink into the recording medium P, occurrence of diffusion, occurrence of droplet interference between ink droplets, and the like before the solvent in the ink evaporates. For example, it is preferable that the infrared laser is emitted within 100 milliseconds from the start of ink discharging. More specifically, because ease of penetration of the ink into the recording medium P, and the like changes depending on the type of the recording medium P, it is preferable that the near-infrared laser is emitted within 100 milliseconds from the start of ink discharging if the recording medium P is a recording medium with low permeability such as coated printing paper, and within a few milliseconds from the start of ink discharging if the recording medium P is a penetrable recording medium such as rough paper. For the above, it is preferable that the laser emitting units 30a, 30b, 30c, and 30d and the ink jet recording heads 20a, 20b, 20c, and 20d are closely disposed. In addition, as different from the example of the ink jet recording apparatus 1, the laser emitting units and the ink jet recording head may be integrated for each color, and may have a configuration in which the laser emitting unit and an ink landing unit are close to each other by using optical systems such as mirrors.

Next, an image forming process by the ink jet recording apparatus 1 will be described. In the ink jet recording apparatus 1, first, the recording medium P is supplied by a supplying unit (not shown) on the rotatably moving belt 12. Next, on the recording medium P supplied, a droplet of the ink (for example, black ink) is discharged from the ink jet recording head 20a based on a predetermined image information, and lands on the recording medium P. After that, the near-infrared laser is immediately emitted to the ink landed on the recording medium P by the laser emitting unit 30a. Accordingly, the ink dries quickly, and therefore infiltration of the ink into the recording medium P, occurrence of diffusion, occurrence of droplet interference between ink droplets, and the like are prevented.

In the same manner as above, discharging of the ink by the ink jet recording heads 20b, 20c, and 20d, and emitting of the near-infrared laser by the laser emitting units 30b, 30c, and 30d are performed, respectively, and an image is formed by the ink of each color (for example, cyan ink, magenta ink, and yellow ink). The ink also dries quickly during this process, and therefore infiltration of the ink into the recording medium P, occurrence of diffusion, occurrence of droplet interference between ink droplets, and the like are prevented. As above, image forming by the ink jet recording apparatus 1 is performed.

Figure 2:
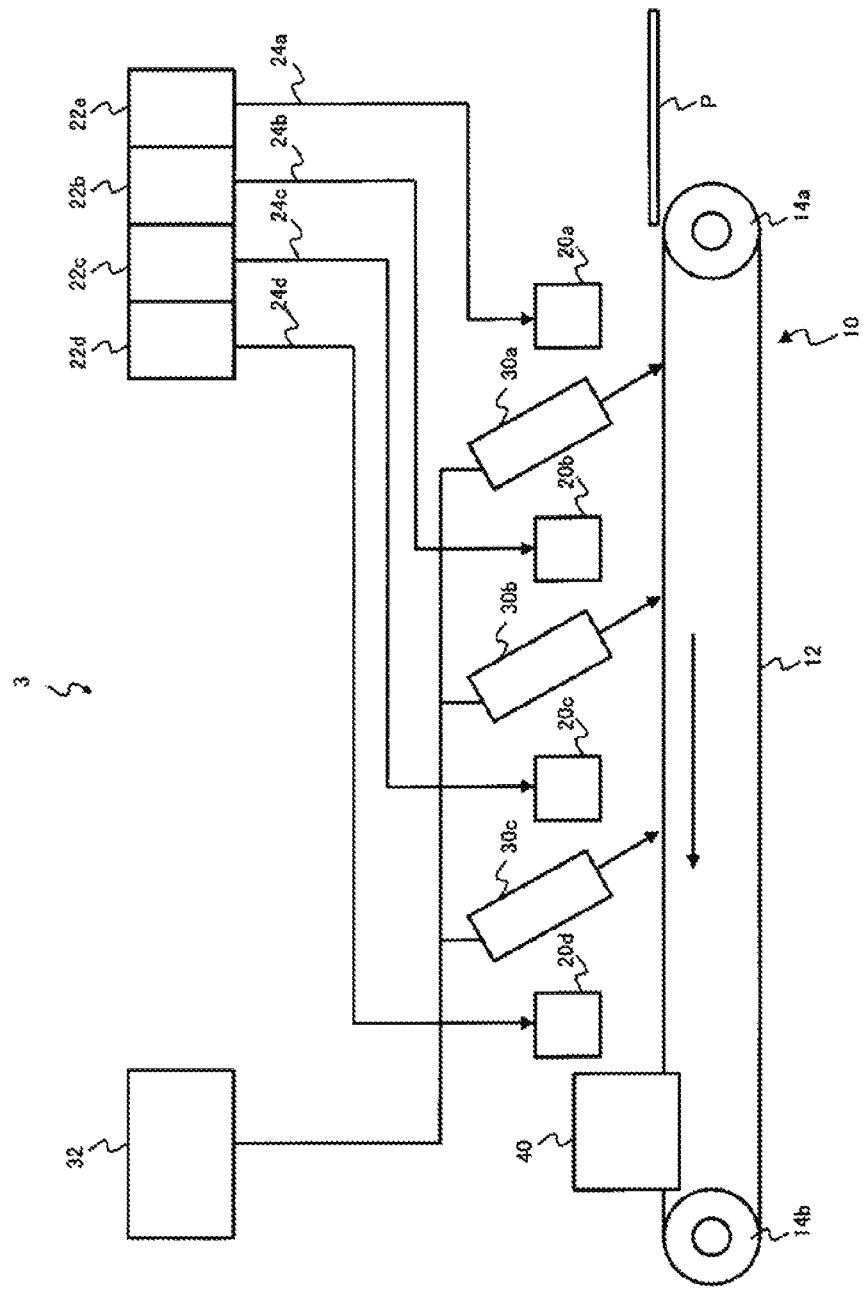
FIG. 2 is a schematic configuration diagram showing another example of the ink jet recording apparatus according to the exemplary embodiment of the invention.

FIG. 2 is a schematic configuration diagram showing another example of the ink jet recording apparatus according to the exemplary embodiment. An ink jet recording apparatus 3 according to the exemplary embodiment shown in FIG. 2 has the configuration and the method of (2). The ink jet recording apparatus 3 includes a carrying unit 10 that carries a recording medium P, four ink jet recording heads 20a, 20b, 20c, and 20d which discharge inks of plural colors on the recording medium P by each color and apply the ink on the recording medium, three laser emitting units 30a, 30b, and 30c, as a near-infrared laser emitting device that emits a near-infrared laser having a center wavelength of 750 nm to 950 nm to the ink discharged to the recording medium P, and a heating device 40 that heats the recording medium P.

The carrying unit 10 is a unit in which an endless belt 12 is stretched by rollers 14a and 14b. The belt 12 stretched by the rollers 14a and 14b is configured such that at least a region facing a nozzle surface (ink discharging region) of each ink jet recording heads 20a, 20b, 20c, and 20d, and an emission region of the near-infrared laser by the laser emitting units 30a, 30b, and 30c become substantially horizontal. In addition, the belt 12 has a width wider than a maximum width of the recording medium P that is a target of the ink jet recording apparatus 3.

A belt drive motor (not shown) is connected to one or both of the rollers 14a and 14b, and the belt 12 rotatably moves in the arrow direction in FIG. 2 by the power of the motor. The recording medium P such as recording paper supplied on the belt 12 is carried from one side (right side) to the other side (left side) on FIG. 2, in accordance with the rotatable movement of the belt 12.

The four ink jet recording heads 20a, 20b, 20c, and 20d are disposed along a side from an upstream side to a downstream side in a carrying direction of the recording medium P, and each are connected via ink tanks 22a, 22b, 22c, and 22d which store the inks of plural colors by color, and pipe lines 24a, 24b, 24c, and 24d. The ink of each color supplied from each of the ink tanks 22a, 22b, 22c, and 22d is discharged from each of the ink jet recording heads 20a, 20b, 20c, and 20d in this order on the recording medium P carried by the carrying unit 10.

For example, the ink jet recording heads 20a, 20b, 20c, and 20d are configured to contain a head 20a that discharges a black ink from the upstream side in the carrying direction of the recording medium P, a head 20b that discharges a cyan ink, a head 20c that discharges a magenta ink, and a head 20d that discharges a yellow ink. The combination of the inks discharged from each of the ink jet recording heads 20a, 20b, 20c, and 20d is not limited to the above configuration, and as long as the combination has a configuration in which the inks of plural colors are discharged by each color, the combination may be a configuration in which a head that discharges an ink having another hue other than the above four colors is further included (that is, a configuration in which 5 or more heads are present), and the combination may be a configuration in which the hue of the ink to be discharged and the order (discharging order) are different from the above configuration.

The three laser emitting units 30a, 30b, and 30c are disposed in the downstream side in the carrying direction of the recording medium P with respect to each of the ink jet recording heads 20a, 20b, and 20c. Each of the laser emitting units 30a, 30b, and 30c has a function of emitting the near-infrared laser, and emission energy of the near-infrared laser, emission timing, oscillation wavelength, and the like are controlled by a laser controller 32. Furthermore, the heating device 40 is disposed on the downstream in the carrying direction of the recording medium P with respect to the ink jet recording head 20d.

An image forming process by the ink jet recording apparatus 3 will be described. In the ink jet recording apparatus 3, first, the recording medium P is supplied by a supplying unit (not shown) on the rotatably moving belt 12. Next, on the recording medium P supplied, a droplet of the ink (for example, black ink) is discharged from the ink jet recording head 20a based on a predetermined image information, lands on the recording medium P. After that, the near-infrared laser is immediately emitted to the ink landed on the recording medium P by the laser emitting unit 30a. Accordingly, the ink dries quickly, and therefore infiltration of the ink into the recording medium P, occurrence of diffusion, occurrence of droplet interference between ink droplets, and the like are prevented.

In the same manner as above, discharging of the ink by the ink jet recording heads 20b and 20c, and emitting of the near-infrared laser by the laser emitting units 30b and 30c are performed, respectively, and an image is formed by the ink of each color (for example, cyan ink and magenta ink). The ink also dries quickly during this process, and therefore infiltration of the ink into the recording medium P, occurrence of diffusion, occurrence of droplet interference between ink droplets, and the like are prevented. Next, after discharging of the ink is performed by the ink jet recording head 20d, the recording medium P is sent to the heating device 40, drying is performed with respect to the entire surface of the recording medium P, and therefore an image is formed by the ink (for example, yellow ink). As above, after applying the ink to be recorded last (for example, yellow ink) on the recording medium P, ink drying is performed by heating the recording medium P without emitting the near-infrared laser. As above, image forming by the ink jet recording apparatus 3 is performed.

The heating device 40 is not particularly limited as long as a device may dry the entire surface of the recording medium P, and examples thereof include a far-infrared heater dryer, a drum heater, a carbon heater, a halogen heater, and the like.

According to the configuration and the method of the ink jet recording apparatus 3, for example, in a case where the near-infrared absorbent affects the coloring of yellow, if setting the ink to be printed last as the yellow ink and configuring the yellow ink so as not to contain the near-infrared absorbent, the coloring of yellow being affected by the near-infrared absorbent may be avoided.

Figure 3:
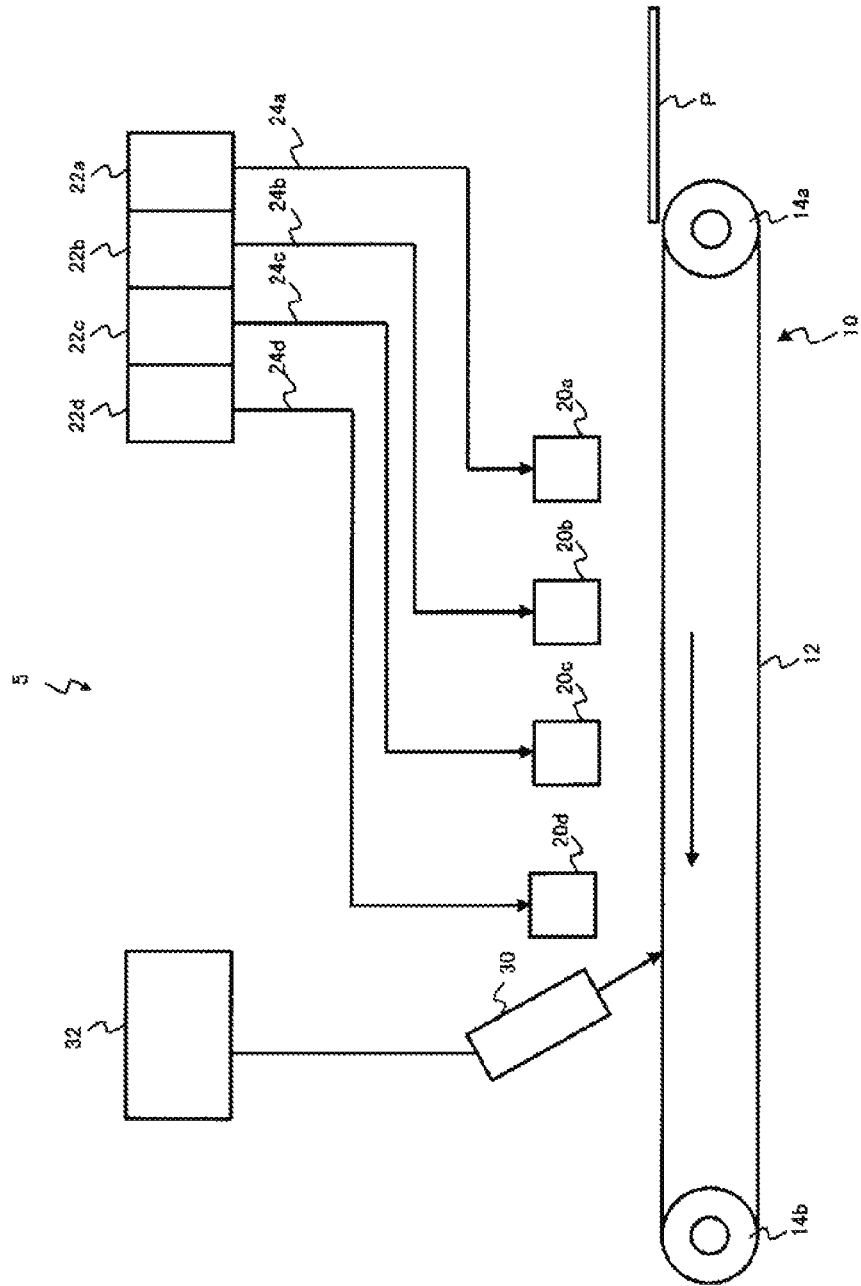
FIG. 3 is a schematic configuration diagram showing still another example of the ink jet recording apparatus according to the exemplary embodiment of the invention.

FIG. 3 is a schematic configuration diagram showing still another example of the ink jet recording apparatus according to the exemplary embodiment of the invention. An ink jet recording apparatus 5 according to the exemplary embodiment shown in FIG. 3 has the configuration and the method of (3). The ink jet recording apparatus 5 includes a carrying unit 10 that carries a recording medium P, four ink jet recording heads 20a, 20b, 20c, and 20d which discharge inks of plural colors on the recording medium P by each color and apply the ink on the recording medium, and a laser emitting unit 30 as a near-infrared laser emitting device that emits a near-infrared laser having a center wavelength of 750 nm to 950 nm to the ink discharged to the recording medium P.

The carrying unit 10 is a unit in which an endless belt 12 is stretched by rollers 14a and 14b. The belt 12 stretched by the rollers 14a and 14b is configured such that at least a region facing a nozzle surface (ink discharging region) of each of the ink jet recording heads 20a, 20b, 20c, and 20d, and an emission region of the near-infrared laser by the laser emitting unit 30 become substantially horizontal. In addition, the belt 12 has a width wider than a maximum width of the recording medium P that is a target of the ink jet recording apparatus 5.

A belt drive motor (not shown) is connected to one or both of the rollers 14a and 14b, and the belt 12 rotatably moves in the arrow direction in FIG. 3 by the power of the motor. The recording medium P such as recording paper supplied on the belt 12 is carried from one side (right side) to the other side (left side) on FIG. 3, in accordance with the rotatable movement of the belt 12.

The four ink jet recording heads 20a, 20b, 20c, and 20d are disposed along a side from an upstream side to a downstream side in a carrying direction of the recording medium P, and each are connected via ink tanks 22a, 22b, 22c, and 22d which store the inks of plural colors by color, and pipe lines 24a, 24b, 24c, and 24d. The ink of each color supplied from each of the ink tanks 22a, 22b, 22c, and 22d is discharged from each of the ink jet recording heads 20a, 20b, 20c, and 20d in this order on the recording medium P carried by the carrying unit 10.

For example, the ink jet recording heads 20a, 20b, 20c, and 20d are configured to contain a head 20a that discharges a black ink from the upstream side in the carrying direction of the recording medium P, a head 20b that discharges a cyan ink, a head 20c that supplies a magenta ink, and a head 20d that discharges a yellow ink. The combination of the inks discharged from each of the ink jet recording heads 20a, 20b, 20c, and 20d is not limited to the above configuration, and as long as the combination has a configuration in which the inks of plural colors are discharged by each color, the combination may be a configuration in which a head that discharges an ink having another hue other than the above four colors is further included (that is, a configuration in which 5 or more heads are present), and the combination may be a configuration in which the hue of the ink to be discharged and the order (discharging order) are different from the above configuration.

The laser emitting unit 30 is disposed in the downstream side with respect to the ink jet recording head 20d on the most downstream side in the carrying direction of the recording medium P. The laser emitting unit 30 has a function of emitting the near-infrared laser, and emission energy of the near-infrared laser, emission timing, oscillation wavelength, and the like are controlled by a laser controller 32.

An image forming process by the ink jet recording apparatus 5 will be described. In the ink jet recording apparatus 5, first, the recording medium P is supplied by a supplying unit (not shown) on the rotatably moving belt 12. Next, on the recording medium P supplied, a droplet of the ink (for example, black ink) is discharged from the ink jet recording head 20a based on a predetermined image information, lands on the recording medium P.

In the same manner as above, discharging of the ink by the ink jet recording heads 20b, 20c, and 20d is performed, respectively, and an image is formed by the ink of each color (for example, cyan ink, magenta ink, and yellow ink). After that, the near-infrared laser is emitted to the ink landed on the recording medium P by the laser emitting unit 30. Accordingly, the ink dries quickly, and therefore infiltration of the ink into the recording medium P, occurrence of diffusion, occurrence of droplet interference between ink droplets, and the like are prevented. As above, image forming by the ink jet recording apparatus 5 is performed.

Among the ink jet recording apparatuses 1, 3, and 5, that is, among the configuration and the method of (1), (2), and (3), the ink jet recording apparatus 1, that is the configuration and the method of (1), is preferable, the ink jet recording apparatus 3, that is the configuration and the method of (2) is more preferable, and the ink jet recording apparatus 1, that is the configuration and the method of (1) is most preferable, from the viewpoint of preventing infiltration of the ink into the recording medium P, occurrence of diffusion, occurrence of droplet interference between ink droplets, and the like.

EXAMPLES

Hereinafter, the exemplary embodiment of the invention will be described in more detail with reference to examples and comparative examples, but the exemplary embodiment of the invention is not limited to the following examples.

Near-Infrared Absorbent (A1)

Near-Infrared Absorbent (A1) is synthesized according to the following scheme (a compound having a structure in which in formula (I), $R^a$, $R^b$, $R^c$, and $R^d$ are represented by formula (I-R), $R^1$ is a methyl group, and n is 0).

A three-neck flask is equipped with a Dean-Stark trap, a reflux condenser tube, a stirring seal and a stirring bar to prepare a reaction container. 2,2,8,8-tetramethyl-3,6-nonadiyne-5-ol and cyclohexane are put in the reaction container. Manganese oxide (IV) powder is added thereto, stirred with a three one motor, and heated to reflux. Water formed during the reaction is removed by azeotropic distillation. By thin layer chromatography, it is confirmed that there is no remaining 2,2,8,8-tetramethyl-3,6-nonadiyne-5-ol. The reactant mixture is allowed to cool and then filtered under reduced pressure to obtain a yellow filtrate (F1). The solid obtained by the filtration is transferred to another container, ethyl acetate is added thereto, and ultrasonic dispersion and filtration is repeated four times to obtain an ethyl acetate extract solution (F2). The ethyl acetate extract solution (F2) and the filtrate (F1) are mixed and concentrated with a rotary evaporator and then with a vacuum pump to obtain an orange colored liquid. The orange colored liquid is distilled under reduced pressure to obtain a pale yellow liquid (Intermediate 1).

A three-neck flask is equipped with a thermometer and a dropping funnel to prepare a reaction container. Sodium hydrogen monosulfide n-hydrate is added to ethanol, and the mixture is stirred at room temperature (20° C.) until dissolved, and then cooled with ice water. When the internal temperature reaches 5° C., a mixed solution of the intermediate 1 and ethanol is added dropwise little by little. The color changed from yellow to orange through dropwise addition. Since the internal temperature increased due to heat generation, dropping is performed in a range of 5° C. to 7° C. of the internal temperature while adjusting the amount of dropping. Thereafter, the ice water bath is removed, and the mixture is stirred at room temperature (20° C.) while spontaneously increasing the temperature. Water is added to the reaction solution, and ethanol is removed with a rotary evaporator. After that, salt is added thereto until being saturated, the mixture is separated with ethyl acetate, and an organic phase is collected. The organic phase is washed twice with saturated ammonium chloride and dried with magnesium sulfate. After drying, concentration is performed under reduced pressure and brown liquid is collected. This brown liquid is distilled under reduced pressure. The fraction started to appear from 200° C., but since the initial distillation component is not contained, the main distillate is obtained when the amount of steam increased. The yellow liquid (Intermediate 2) is distilled.

A three-neck flask is equipped with a stirring rod and Intermediate 2, a nitrogen inlet tube and a reflux condenser are attached thereto, and nitrogen substitution is performed. Under a nitrogen atmosphere, anhydrous tetrahydrofuran is added with a syringe, and 1M tetrahydrofuran (THF) solution of methylmagnesium bromide is dropped with the syringe while stirring at room temperature (20° C.). After completion of the dropwise addition, the reaction solution is heated and stirred and refluxed. The reaction solution is allowed to cool under a nitrogen atmosphere, and while cooling in an ice water bath, a solution in which ammonium bromide is dissolved in water is added dropwise. The reaction mixture is further stirred at room temperature (20° C.), and then n-hexane is added thereto and dried with sodium sulfate. After drying, the n-hexane/THF solution is removed with a syringe and the inorganic layer is washed with ethyl acetate to obtain an extract. The n-hexane/THF solution and the extract from the inorganic layer are mixed, concentrated under the reduced pressure, and then vacuum-dried to obtain Intermediate 3.

Intermediate 3 and squaric acid are dispersed in a mixed solvent of cyclohexane and isobutanol under a nitrogen atmosphere, pyridine is added thereto, and the mixture is heated to reflux. Thereafter, isobutanol is added thereto and the reactant mixture is further heated to reflux. Water generated during the reaction is removed by azeotropic distillation. After allowing the reactant mixture to cool, filtration under the reduce pressure is carried out to remove insoluble substances. The filtrate is concentrated with a rotary evaporator. Methanol is added to the residue, and after heating to 40° C., the mixture is cooled to −10° C. The crystals are obtained by filtration and vacuum-dried to obtain Near-Infrared Absorbent (A1).

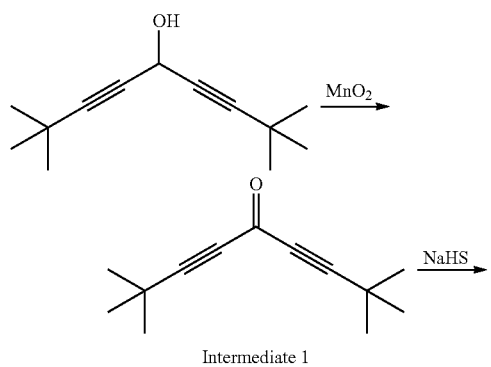

Intermediate 1

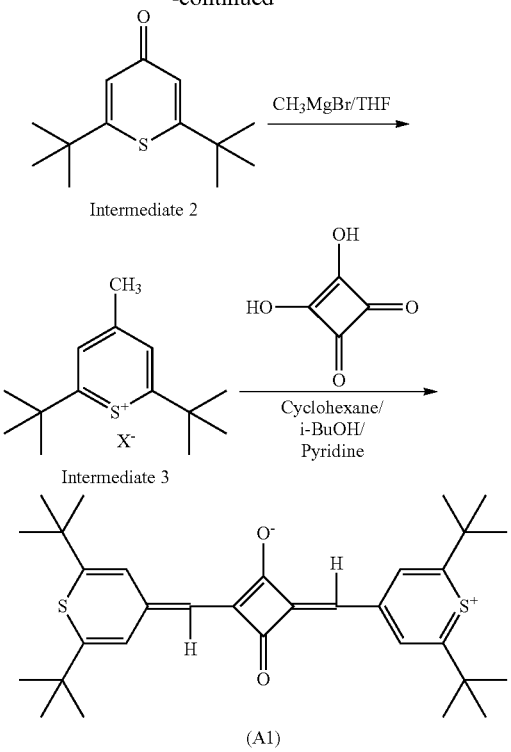

Example 1

Preparation of Near-Infrared Absorbent Dispersion A1

13.5 parts by weight of a styrene/ethyl methacrylate/acrylic acid-2-carboxyethyl copolymer (30/60/10) (acid value: 34 mg KOH/g, weight-average molecular weight: 32,000) as a resin dispersant, 1.5 parts by weight of a squarylium dye represented by the following compound (A1) as a near-infrared absorbent, 60.0 parts by weight of methyl ethyl ketone, 8.0 parts by weight of 1 mol/L sodium hydroxide, 100.0 parts by weight of ion-exchanged water, 300 parts by weight of 0.1 mm zirconia beads are supplied to a vessel and dispersed for 6 hours at 1,000 rpm by using a ready mill disperser (manufactured by Aimex Co., Ltd.). The obtained dispersion is concentrated under reduced pressure with an evaporator until methyl ethyl ketone is sufficiently distilled off, and concentrated until the solid content concentration reaches 20% by weight to prepare Near-Infrared Absorbent Dispersion A1.

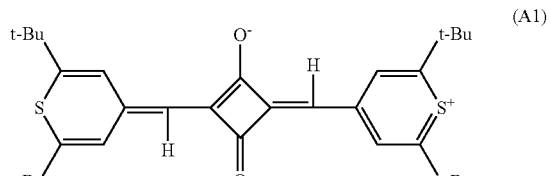

Cyan Ink 1

| | |
|---|---|
| Coloring material (pigment) Pigment Blue 15:4 | 4% by weight |
| Styrene-methacrylic acid ester-methacrylic acid sodium salt copolymer (pigment dispersant) | 0.4% by weight |

-continued

| | |
|---|---|
| Near-Infrared Absorbent Dispersion A1 | 5% by weight |
| Propylene glycol | 10% by weight |
| Diethylene glycol monoisopropyl ether | 5% by weight |
| 1,2-hexanediol | 1% by weight |
| OLFINE E1010 (surfactant) | 0.5% by weight |
| OLFINE E1004 (surfactant) | 0.5% by weight |
| Polyurethane emulsion (solid 25% by weight) | 3% by weight |
| Pure water | 70.6% by weight |

After mixing the above components, filtration is carried out with a 5 μm filter to obtain Cyan Ink 1.

Magenta Ink 1

| | |
|---|---|
| Coloring material (pigment) Pigment Red 122 | 6% by weight |
| Styrene-methacrylic acid ester-methacrylic acid sodium salt copolymer (pigment dispersant) | 0.6% by weight |
| Near-Infrared Absorbent Dispersion A1 | 5% by weight |
| Propylene glycol | 10% by weight |
| Diethylene glycol monoisopropyl ether | 5% by weight |
| 1,2-hexanediol | 1% by weight |
| OLFINE E1010 (surfactant) | 0.6% by weight |
| OLFINE E1004 (surfactant) | 0.4% by weight |
| Polyurethane emulsion (solid 25% by weight) | 3% by weight |
| Pure water | 68.4% by weight |

After mixing the above components, filtration is carried out with a 5 μm filter to obtain Magenta Ink 1.

Yellow Ink 1

| | |
|---|---|
| Coloring material (pigment) Pigment Yellow 74 | 4% by weight |
| Styrene-methacrylic acid ester-methacrylic acid sodium salt copolymer (pigment dispersant) | 0.4% by weight |
| Near-Infrared Absorbent Dispersion A1 | 5% by weight |
| Propylene glycol | 12% by weight |
| Diethylene glycol monoisopropyl ether | 5% by weight |
| 1,2-hexanediol | 1% by weight |
| OLFINE E1010 (surfactant) | 0.6% by weight |
| OLFINE E1004 (surfactant) | 0.4% by weight |
| Polyurethane emulsion (solid 25% by weight) | 3% by weight |
| Pure water | 68.6% by weight |

After mixing the above components, filtration is carried out with a 5 μm filter to obtain Yellow Ink 1.

Evaluation

Absorbance of Ink

The absorption spectrum of each ink is evaluated by the following method. The spectrophotometer V-560 manufactured by JASCO Corporation is used. Using a quartz glass cell having an optical path length of 1 cm, each color ink diluted with water (for example, distilled water) having the same quality as water used for preparing each color ink (cyan, magenta, yellow) is set on a sample side, and water having the same quality as water used for preparing each color ink (for example, distilled water) is set on a reference side. The dilution ratio is diluted such that the absorbance measured by the device became about 0.5 to 4. At this time, it is diluted 200 times. The absorbance of each wavelength is measured at every 1 nm. The peak wavelength of the absorbance at 780 nm or more is 817 nm in any of the inks. The wavelength range that is 90% or more of the absorbance at this peak wavelength is 812 to 822 nm (10 nm). The wavelength range that is 80% or more is 809 to 824 (15 nm).

Using an ink set containing Cyan Ink 1, Magenta Ink 1 and Yellow Ink 1, recording is performed on OK TOP COAT+(manufactured by Oji Paper Company) as a recording medium with low permeability by the ink jet recording apparatus shown in FIG. 1. The evaluation of recording is performed in a case where the center wavelength of oscillation of the laser is 817 nm, and cases of 813 nm, 810 nm, and 805 nm. The emission energy is adjusted to be 3 J/cm$^2$. The results are summarized in Table 1.

Image Unevenness

Image unevenness is evaluated as image quality evaluation. Using an ink set containing Cyan Ink 1, Magenta Ink 1 and Yellow Ink 1, recording is performed on OK TOP COAT+(manufactured by Oji Paper Company) as a recording medium with low permeability by the ink jet recording apparatus shown in FIG. 1. Monochromatic and secondary color solid patches are visually evaluated according to the following criteria. The results are summarized in Table 1.

A: The entire solid patch appears to be uniform
B: Although some graininess deterioration is observed, there is no clear unevenness
C: Unevenness may be visually recognized Image Fixability Another OK TOP COAT+ that is not subjected to recording is overlapped on the surface on which the recording is carried out, and a weight of 100 g/cm$^2$ is placed thereon, and then stored at 60° C. After one day, whether there is color transfer on the overlapped OK TOP COAT+ is visually confirmed with the following criteria. The results are summarized in Table 1.

A: Color transfer is not confirmed
B: Color transfer is confirmed with careful observation
C: Color transfer may be confirmed instantly Example 2

Preparation of Near-Infrared Absorbent Dispersion A2

19.9 parts by weight of a styrene/ethyl methacrylate/acrylic acid-2-carboxyethyl copolymer (30/60/10) (acid value: 34 mg KOH/g, weight-average molecular weight: 32,000) as a resin dispersant, 0.1 parts by weight of a squarylium dye represented by the compound (A1) as a near-infrared absorbent, 60.0 parts by weight of methyl ethyl ketone, 8.0 parts by weight of 1 mol/L sodium hydroxide, 100.0 parts by weight of ion-exchanged water, 300 parts by weight of 0.1 mm zirconia beads are supplied to a vessel and dispersed for 6 hours at 1,000 rpm by using a ready mill disperser (manufactured by Aimex Co., Ltd.). The obtained dispersion is concentrated under reduced pressure with an evaporator until methyl ethyl ketone is sufficiently distilled off, and concentrated until the solid content concentration reaches 30% by weight to prepare Near-Infrared Absorbent Dispersion A2.

This Near-Infrared Absorbent Dispersion A2 and Near-Infrared Absorbent Dispersion A1 prepared in Example 1 are mixed at a ratio of 1:3 by weight.

Preparation of Ink

The cyan ink, the magenta ink, and the yellow ink are prepared in the same manner as in Example 1 except that the near-infrared absorbent dispersion is increased by 1% by weight from Example 1 to become 6% by weight, and that the polypropylene glycol is reduced by 1% by weight from Example 1.

Evaluation

The evaluation is carried out in the same manner as in Example 1. The results are shown in Table 1. The peak wavelength of the absorbance at 780 nm or more is 822 nm in any of the inks. The wavelength range that is 90% or more of the absorbance at this peak wavelength is 814 to 830 nm (16 nm). The wavelength range that is 80% or more is 812 to 836 (24 nm).

Example 3

Preparation of Near-Infrared Absorbent Dispersion A3

13.5 parts by weight of a styrene/ethyl methacrylate/acrylic acid-2-carboxyethyl copolymer (30/60/10) (acid value: 34 mg KOH/g, weight-average molecular weight: 32,000) as a resin dispersant, 1.5 parts by weight of a squarylium dye represented by the compound (A1) as a near-infrared absorbent, 60.0 parts by weight of methanol, 8.0 parts by weight of 1 mol/L sodium hydroxide, 100.0 parts by weight of ion-exchanged water, 300 parts by weight of 0.1 mm zirconia beads are supplied to a vessel and dispersed for 6 hours at 1,000 rpm by using a ready mill disperser (manufactured by Aimex Co., Ltd.). The obtained dispersion is concentrated under reduced pressure with an evaporator until methanol is sufficiently distilled off, and concentrated until the solid content concentration reaches 20% by weight to prepare Near-Infrared Absorbent Dispersion A3.

This Near-Infrared Absorbent Dispersion A3 and Near-Infrared Absorbent Dispersion A1 prepared in Example 1 are mixed at a ratio of 5:4 by weight.

Preparation of Ink

The cyan ink, the magenta ink, and the yellow ink are prepared in the same manner as in Example 1.

Evaluation

The evaluation is carried out in the same manner as in Example 1. The results are shown in Table 1. The peak wavelength of the absorbance at 780 nm or more is 812 nm in any of the inks. The wavelength range that is 90% or more of the absorbance at this peak wavelength is 804 to 820 nm (16 nm). The wavelength range that is 80% or more is 799 to 824 (25 nm).

Near-Infrared Absorbent (B)

Near-Infrared Absorbent (B) is synthesized in the same procedure as in Near-Infrared Absorbent (A1).

Example 4

Preparation of Near-Infrared Absorbent Dispersion A4

13.5 parts by weight of a styrene/ethyl methacrylate/acrylic acid-2-carboxyethyl copolymer (30/60/10) (acid value: 34 mg KOH/g, weight-average molecular weight: 32,000) as a resin dispersant, 1.5 parts by weight of a squarylium dye represented by the following compound (B) as a near-infrared absorbent, 60.0 parts by weight of methyl ethyl ketone, 8.0 parts by weight of 1 mol/L sodium hydroxide, 100.0 parts by weight of ion-exchanged water, 300 parts by weight of 0.1 mm zirconia beads are supplied to a vessel and dispersed for 6 hours at 1,000 rpm by using a ready mill disperser (manufactured by Aimex Co., Ltd.). The obtained dispersion is concentrated under reduced pressure with an evaporator until methyl ethyl ketone is sufficiently distilled off, and concentrated until the solid content concentration reaches 20% by weight to prepare Near-Infrared Absorbent Dispersion A4.

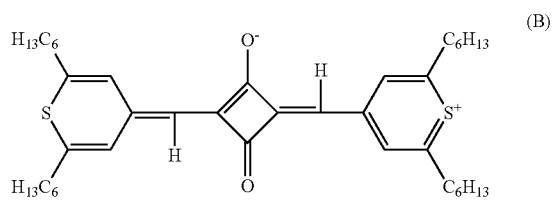

(B)

This Near-Infrared Absorbent Dispersion A4 and Near-Infrared Absorbent Dispersion A1 prepared in Example 1 are mixed at a ratio of 5:6 by weight.

Preparation of Ink

The cyan ink, the magenta ink, and the yellow ink are prepared in the same manner as in Example 2.

Evaluation

The evaluation is carried out in the same manner as in Example 1. The results are shown in Table 1. The peak wavelength of the absorbance at 780 nm or more is 813 nm in any of the inks. The wavelength range that is 90% or more of the absorbance at this peak wavelength is 803 to 823 nm (20 nm). The wavelength range that is 80% or more is 799 to 828 (29 nm).

Example 5

Near-Infrared Absorbent Dispersion A5 is prepared in the same manner as in Example 1 except that 60.0 parts by weight of methyl ethyl ketone is changed to 30.0 parts by weight of tetrahydrofuran and 30.0 parts by weight of methyl ethyl ketone. The evaluation is carried out in the same manner as in Example 1. The results are shown in Table 1. The peak wavelength of the absorbance at 780 nm or more is 817 nm in any of the inks. The wavelength range that is 90% or more of the absorbance at this peak wavelength is 814 to 820 nm (6 nm). The wavelength range that is 80% or more is 812 to 822 (10 nm).

Example 6

The cyan ink, the magenta ink, and the yellow ink are prepared in the same manner as in Example 1 except that a squarylium dye having the following formula is used as the near-infrared absorbent. The results are shown in Table 1. The peak wavelength of the absorbance at 780 nm or more is 901 nm in any of the inks. The wavelength range that is 90% or more of the absorbance at this peak wavelength is 894 to 908 nm (14 nm). The wavelength range that is 80% or more is 891 to 911 (20 nm).

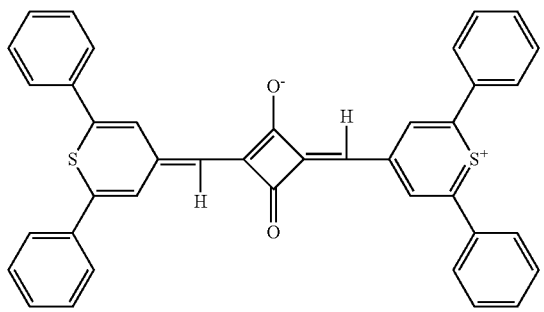 [SMILES: O=C1C(C=C2C=C(c3ccccc3)SC(c3ccccc3)=C2)=C([O-])/C1=C/c1cc(-c2ccccc2)[s+]c(-c2ccccc2)c1]

Comparative Example 1

Preparation of Near-Infrared Absorbent Dispersion B2

13.5 parts by weight of a styrene/butyl acrylate/ethyl methacrylate/sodium styrene sulfonate copolymer (30/20/44/6) as a resin dispersant, 5 parts by weight of CAS No. 172616-80-7 that is a cyanine dye as a near-infrared absorbent, 60.0 parts by weight of methanol, 8.0 parts by weight of 1 mol/L sodium hydroxide, 100.0 parts by weight of ion-exchanged water, 300 parts by weight of 0.1 mm zirconia beads are supplied to a vessel and dispersed for 6 hours at 1,000 rpm by using a ready mill disperser (manufactured by Aimex Co., Ltd.). The obtained dispersion is concentrated under reduced pressure with an evaporator until methanol is sufficiently distilled off, and concentrated until the solid content concentration reaches 20% by weight to prepare Near-Infrared Absorbent Dispersion B2.

This Near-Infrared Absorbent Dispersion B2 and Near-Infrared Absorbent Dispersion A1 prepared in Example 1 are mixed at a ratio of 1:2 by weight.

Preparation of Ink

The cyan ink, the magenta ink, and the yellow ink are prepared in the same manner as in Example 2, but agglomeration and precipitation occurred, which did not lead to evaluation.

Comparative Example 2

Near-Infrared Absorbent Dispersion B2 is prepared in the same manner as in Example 1 except that 60.0 parts by weight of methyl ethyl ketone is changed to 55.0 parts by weight of tetrahydrofuran and 5.0 parts by weight of methyl ethyl ketone. The results are shown in Table 1. The peak wavelength of the absorbance at 780 nm or more is 817 nm in any of the inks. The wavelength range that is 90% or more of the absorbance at this peak wavelength is 816 to 818 nm (2 nm). The wavelength range that is 80% or more is 814 to 821 (7 nm).

As above, even if variations of the emission wavelength of the laser that generates near-infrared occur, the ink of the example suppressed the deterioration in the image quality and the image fixability, compared to the ink of the comparative example in which a continuous range of wavelengths in which an absorption amount of the ink is not less than 80% of a maximum absorption amount of the ink in a near-infrared region is not 10 nm or more.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An aqueous ink for ink jet recording, comprising:
water;
a water-soluble organic solvent;
a coloring material; and
a near-infrared absorbent,
wherein a continuous range of wavelengths in which an absorption amount of the ink is not less than 80% of a

TABLE 1

|  | 80% or more | 90% or more |  | Oscillation wavelength of laser [nm] | | | |
| --- | --- | --- | --- | --- | --- | --- | --- |
| Example 1 | 809-824 (15) | 812-822 (10) |  | 817 | 813 (−4 nm) | 810 (−7 nm) | 805 (−12 nm) |
|  |  |  | Image unevenness | A | A | B | C |
|  |  |  | Fixability | A | A | B | C |
| Example 2 | 812-836 (24) | 814-830 (16) |  | 822 | 818 (−4 nm) | 815 (−7 nm) | 810 (−12 nm) |
|  |  |  | Image unevenness | A | A | A | A |
|  |  |  | Fixability | A | A | A | A |
| Example 3 | 799-824 (25) | 804-820 (16) |  | 812 | 808 (−4 nm) | 805 (−7 nm) | 800 (−12 nm) |
|  |  |  | Image unevenness | A | A | A | A |
|  |  |  | Fixability | A | A | A | A |
| Example 4 | 799-828 (29) | 803-823 (20) |  | 813 | 809 (−4 nm) | 806 (−7 nm) | 801 (−12 nm) |
|  |  |  | Image unevenness | A | A | A | A |
|  |  |  | Fixability | A | A | A | A |
| Example 5 | 812-822 (10) | 814-820 (6) |  | 817 | 813 (−4 nm) | 810 (−7 nm) | 805 (−12 nm) |
|  |  |  | Image unevenness | A | B | C | C |
|  |  |  | Fixability | A | B | C | C |
| Example 6 | 891-911 (20) | 894-908 (14) |  | 901 | 897 (−4 nm) | 894 (−7 nm) | 889 (−12 nm) |
|  |  |  | Image unevenness | B | B | B | C |
|  |  |  | Fixability | B | B | B | C |
| Comparative Example 1 | — | — | Image unevenness | Not evaluated | | | |
|  |  |  | Fixability | Not evaluated | | | |
| Comparative Example 2 | 814-821 (7) | 816-818 (2) |  | 817 | 813 (−4 nm) | 810 (−7 nm) | 805 (−12 nm) |
|  |  |  | Image unevenness | A | C | C | C |
|  |  |  | Fixability | A | C | C | C | maximum absorption amount of the ink in a near-infrared region is 10 nm or more, and
the near-infrared absorbent is a compound represented by the following formula (I):

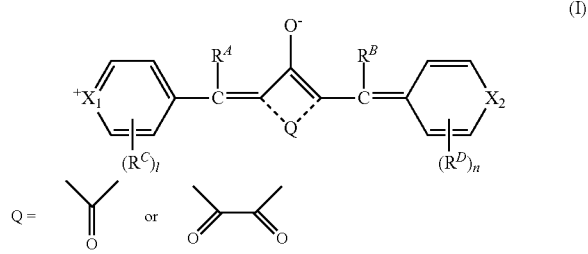

wherein, in formula (I), $X_1$ and $X_2$ each independently represent an oxygen atom, a sulfur atom, a selenium atom, or a tellurium atom, $R^A$ and $R^B$ each independently represent a hydrogen atom or an alkyl group having 1 carbon atom, $R^C$ and $R^D$ each independently represent a monovalent substituent, and l and n each independently represent an integer of 0 to 4.

2. The aqueous ink for ink jet recording according to claim 1,
wherein the continuous range of wavelengths in which an absorption amount of the ink is not less than 80% of a maximum absorption amount of the ink in a near-infrared region is 20 nm or more.

3. The aqueous ink for ink jet recording according to claim 1,
wherein a continuous range of wavelengths in which an absorption amount of the ink is not less than 90% of a maximum absorption amount of the ink in a near-infrared region is 10 nm or more.

4. The aqueous ink for ink jet recording according to claim 1,
wherein the continuous range of wavelengths in which an absorption amount of the ink is not less than 90% of a maximum absorption amount of the ink in a near-infrared region is 20 nm or more.

5. The aqueous ink for ink jet recording according to claim 1,
wherein the near-infrared absorbent is a squarylium compound having a structure represented by the following formula (II):

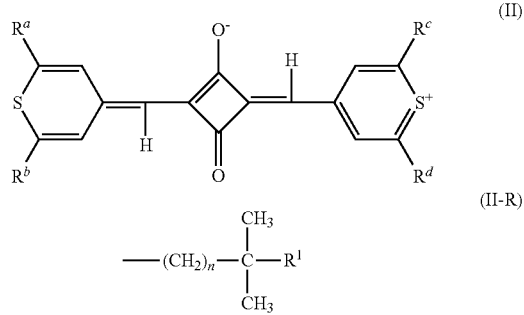

wherein $R^a$, $R^b$, $R^c$, and $R^d$ each independently represent a structure represented by formula (II-R) or an unbranched alkyl group having 1 to 6 carbon atoms, $R^1$ represents a hydrogen atom or a methyl group, n represents an integer of 0 to 3, and a total number of carbon atoms in the structure represented by formula (II-R) is 6 or less.

6. The aqueous ink for ink jet recording according to claim 1, further comprising:
a mixture of two or more near-infrared absorbent dispersions each containing the near-infrared absorbent and a resin dispersant and are different in the ratio of the near-infrared absorbent to the resin dispersant,
wherein at least one of the near-infrared absorbents is a near-infrared absorbent represented by formula (I).

7. The aqueous ink for ink jet recording according to claim 6, wherein the resin dispersant is at least one selected from the following (a) to (e):
(a) polyurethane,
(b) polyester,
(c) polyamide,
(d) polyurea, and
(e) polycarbonate.

8. The aqueous ink for ink jet recording according to claim 6,
wherein the resin dispersant contains a structural unit represented by the following formula (III) and a structural unit derived from alkyl (meth)acrylate, and is a vinyl polymer having an acid value of 6 mg KOH/g to 100 mg KOH/g:

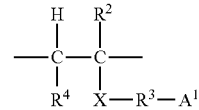

wherein $R^2$ represents a hydrogen atom, a methyl group, or —X—$R^3$-$A^1$, $R^4$ represents a hydrogen atom or —X—$R^3$-$A^1$, X represents —C(=O)—, —C(=O)O—, —C(=O)NH—, —OC(=O)—, phenylene, a divalent group corresponding to a heterocyclic ring, or a single bond, $R^3$ represents a divalent linking group or a single bond, $A_1$ represents —$SO_3H$, —COOH, or —$OPO_3H_2$, in a case where two or more of —X—$R^3$-$A^1$'s are present in the same unit, plural X's, $R^3$'s, or $A^1$'s each may be the same as or different from each other, and plural units having different structures may be present in the same molecule.

9. The aqueous ink for ink jet recording according to claim 8,
wherein a weight-average molecular weight of the resin dispersant is from 3,000 to 200,000.

10. The aqueous ink for ink jet recording according to claim 6,
wherein the resin dispersant is a resin which contains at least one structural unit having a carboxy group as a hydrophilic structural unit and a structural unit derived from alkyl (meth)acrylate, and which has an acid value of 15 mg KOH/g to 150 mg KOH/g.

11. The aqueous ink for ink jet recording according to claim 1, further comprising:
a mixture of two or more near-infrared absorbent dispersions in which the near-infrared absorbent is dispersed in an organic solvent, the organic solvents in the dispersions being different from each other.

12. The aqueous ink for ink jet recording according to claim 11, wherein the different organic solvents are propylene glycol and diethylene glycol monoisopropyl ether.

13. The aqueous ink for ink jet recording according to claim 1, further comprising:
two or more different near-infrared absorbents.

14. An aqueous ink set for ink jet recording, comprising:
one or a plurality of color inks that are the aqueous ink for ink jet recording according to claim 1 in which the coloring material is chromatic.

15. The aqueous ink set for ink jet recording according to claim 14, comprising a cyan ink containing a phthalocyanine pigment, a magenta ink containing any one of an azo pigment or a quinacridone pigment, and a yellow ink containing an azo pigment.

16. An ink jet recording apparatus, comprising:
a recording head that discharges the aqueous ink for ink jet recording according to claim 1 to apply the ink on a recording medium; and
a near-infrared laser emitting device that emits a near-infrared laser having a center wavelength of 750 nm to 950 nm to the ink applied on the recording medium.

17. The ink jet recording apparatus according to claim 16, wherein the near-infrared laser emitting device is a surface emitting laser whose variation of each emission spectrum is within 20 nm.

18. An aqueous ink for ink jet recording, comprising:
water;
a water-soluble organic solvent;
a coloring material; and
a mixture of two or more near-infrared absorbent dispersions each containing a near-infrared absorbent and a resin dispersant and are different in a ratio of the near-infrared absorbent to the resin dispersant,
wherein a continuous range of wavelengths in which an absorption amount of the ink is not less than 80% of a maximum absorption amount of the ink in a near-infrared region is 10 nm or more.

* * * * *